(12) United States Patent
Kakihara et al.

(10) Patent No.: US 10,044,309 B2
(45) Date of Patent: Aug. 7, 2018

(54) ROTATING ELECTRIC MACHINE, ROTATING ELECTRIC MACHINE CONTROLLER AND METHOD FOR CONTROLLING ROTATING ELECTRIC MACHINE

(71) Applicant: KABUSHIKI KAISHA YASKAWA DENKI, Kitakyushu-shi (JP)

(72) Inventors: Masanobu Kakihara, Kitakyushu (JP); Mitsuru Iwakiri, Kitakyushu (JP); Kensuke Nakazono, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 15/367,176

(22) Filed: Dec. 2, 2016

(65) Prior Publication Data

US 2017/0085201 A1    Mar. 23, 2017

Related U.S. Application Data

(63) Continuation of application No. PCT/JP2014/065246, filed on Jun. 9, 2014.

(51) Int. Cl.
| H02P 21/24 | (2016.01) |
| H02K 1/08 | (2006.01) |
| H02K 1/14 | (2006.01) |
| H02K 1/27 | (2006.01) |
| H02P 6/14 | (2016.01) |

(52) U.S. Cl.
CPC .............. *H02P 21/24* (2016.02); *H02K 1/08* (2013.01); *H02K 1/146* (2013.01); *H02K 1/2706* (2013.01); *H02K 1/2773* (2013.01); *H02P 6/14* (2013.01)

(58) Field of Classification Search
CPC .... H02K 1/2713; H02K 1/146; H02K 1/2706; H02K 15/03; H02K 15/02; H02K 15/0435; H02K 2201/06
See application file for complete search history.

(56) References Cited

U.S. PATENT DOCUMENTS

| 3,861,026 A * | 1/1975 | Swaim | H02K 3/325 |
| | | | 242/432.6 |
| 6,933,649 B2 * | 8/2005 | Fujii | H02K 1/148 |
| | | | 29/596 |
| 7,528,521 B2 * | 5/2009 | Naitou | A61G 5/045 |
| | | | 310/257 |
| 7,642,686 B2 * | 1/2010 | Naitou | H02K 1/148 |
| | | | 310/216.058 |

(Continued)

FOREIGN PATENT DOCUMENTS

| CN | 1647359 | 7/2005 |
| CN | 102377257 | 3/2012 |

(Continued)

OTHER PUBLICATIONS

Japanese Office Action for corresponding JP Application No. 2016-527514, dated Jun. 9, 2017 (w/ English machine translation).

(Continued)

*Primary Examiner* — Bentsu Ro
*Assistant Examiner* — Thai Dinh
(74) *Attorney, Agent, or Firm* — Mori & Ward, LLP

(57) ABSTRACT

A rotating electric machine includes a stator, a rotor, and a stator core. The stator core includes a plurality of teeth. Each of the teeth includes at least one of a through hole axially piercing the tooth and a recess extending from one end of the tooth to another end of the tooth in an axial direction.

8 Claims, 26 Drawing Sheets

(56) References Cited

U.S. PATENT DOCUMENTS

| | | | |
|---|---|---|---|
| 2004/0124733 A1* | 7/2004 | Yamamoto | B29C 70/72 310/216.044 |
| 2005/0146232 A1* | 7/2005 | Yamamoto | B29C 70/72 310/43 |
| 2005/0146306 A1 | 7/2005 | Ha et al. | |
| 2010/0207555 A1 | 8/2010 | Ide et al. | |
| 2012/0038237 A1 | 2/2012 | Li et al. | |
| 2013/0241340 A1* | 9/2013 | Koga | H02K 1/2773 310/156.56 |
| 2014/0055001 A1 | 2/2014 | Ogawa et al. | |
| 2014/0084741 A1* | 3/2014 | Iwasaki | H02K 29/03 310/216.091 |
| 2014/0111053 A1* | 4/2014 | Yoshizawa | H02K 1/2773 310/156.53 |
| 2014/0306569 A1* | 10/2014 | Kojima | H02K 1/28 310/156.21 |
| 2015/0001975 A1* | 1/2015 | Nakazono | H02K 1/06 310/152 |

FOREIGN PATENT DOCUMENTS

| | | |
|---|---|---|
| CN | 103166559 | 6/2013 |
| CN | 103326486 | 9/2013 |
| CN | 103427746 | 12/2013 |
| CN | 103460557 | 12/2013 |
| JP | 2000-102300 | 4/2000 |
| JP | 2001-286109 | 10/2001 |
| JP | 2004-153886 | 5/2004 |
| JP | 2008-308157 | 12/2008 |
| JP | 2010-063208 | 3/2010 |
| JP | 2010-172080 | 8/2010 |
| JP | 2012-39863 | 2/2012 |
| WO | WO 2012/147310 | 11/2012 |

OTHER PUBLICATIONS

International Search Report for corresponding International Application No. PCT/JP2014/065246, dated Aug. 19, 2014.
Written Opinion for corresponding International Application No. PCT/JP2014/065246, dated Aug. 19, 2014.
The International Preliminary Report on Patentability (Chapter I) with translation of Written Opinion for corresponding International Application No. PCT/JP2014/065246, dated Dec. 22, 2016.
Chinese Office Action for corresponding CN Application No. 201480079483.7, dated Jun. 15, 2018.

* cited by examiner

[FIG. 1]
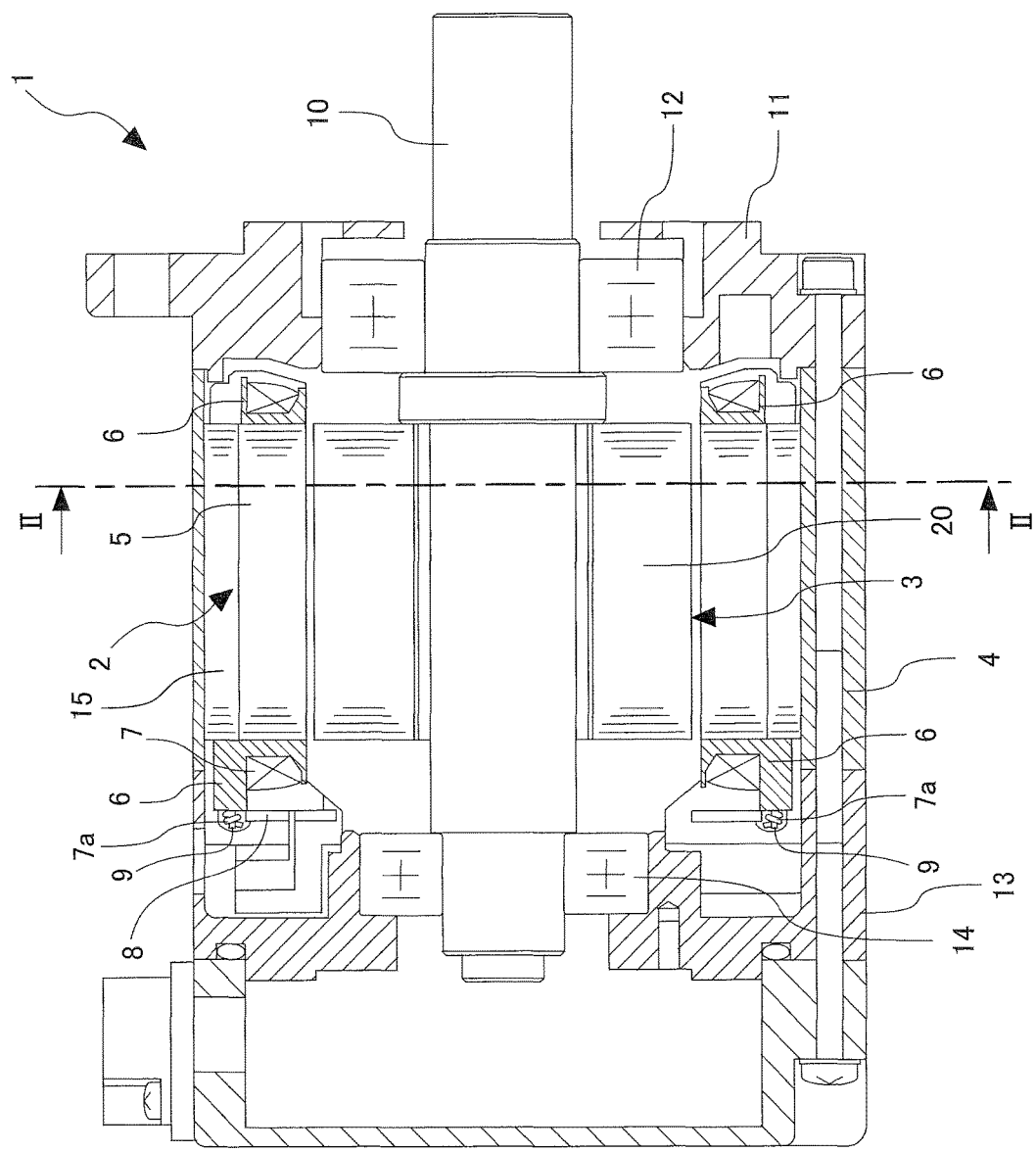

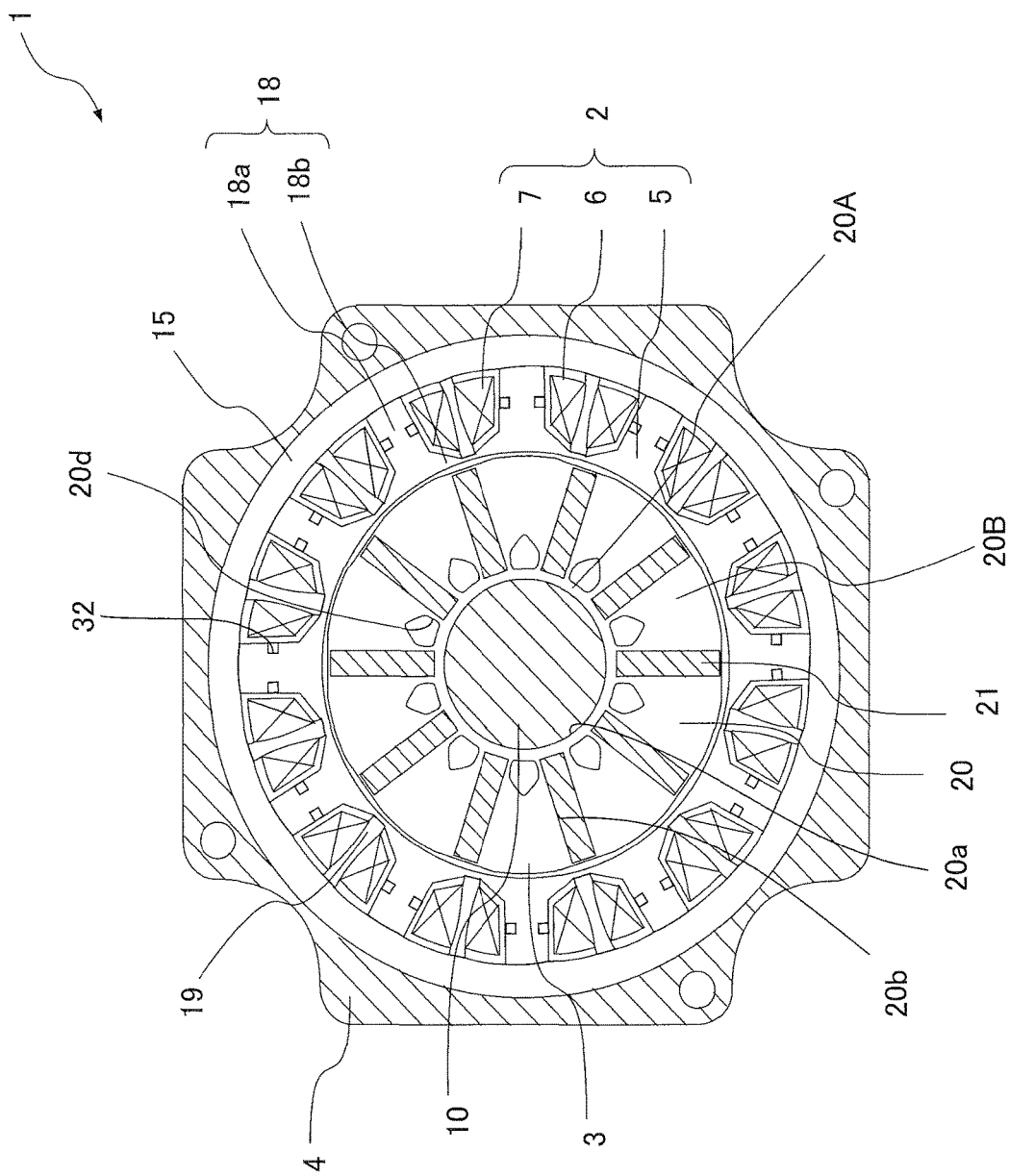
[FIG. 2]

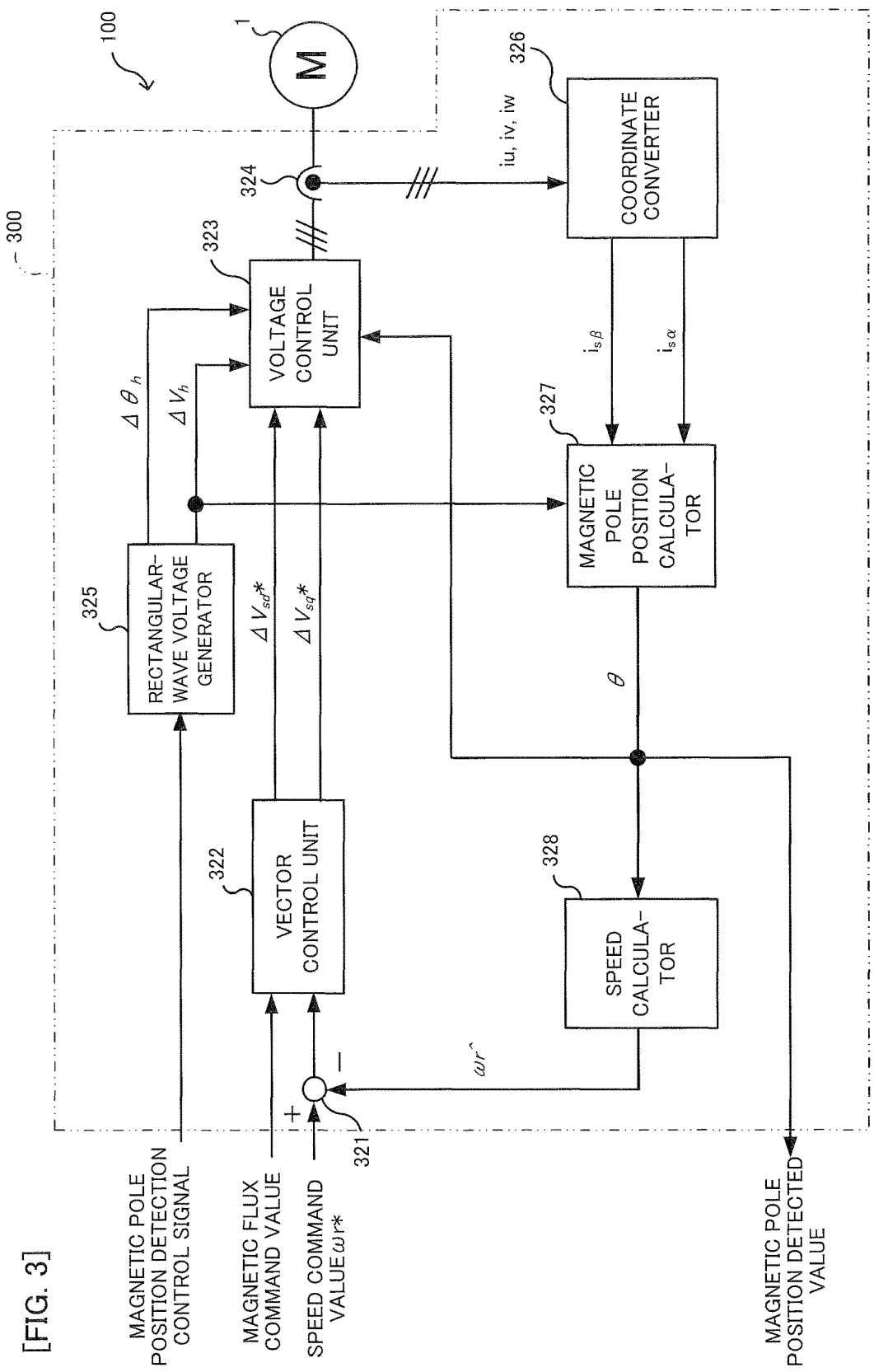
[FIG. 3]

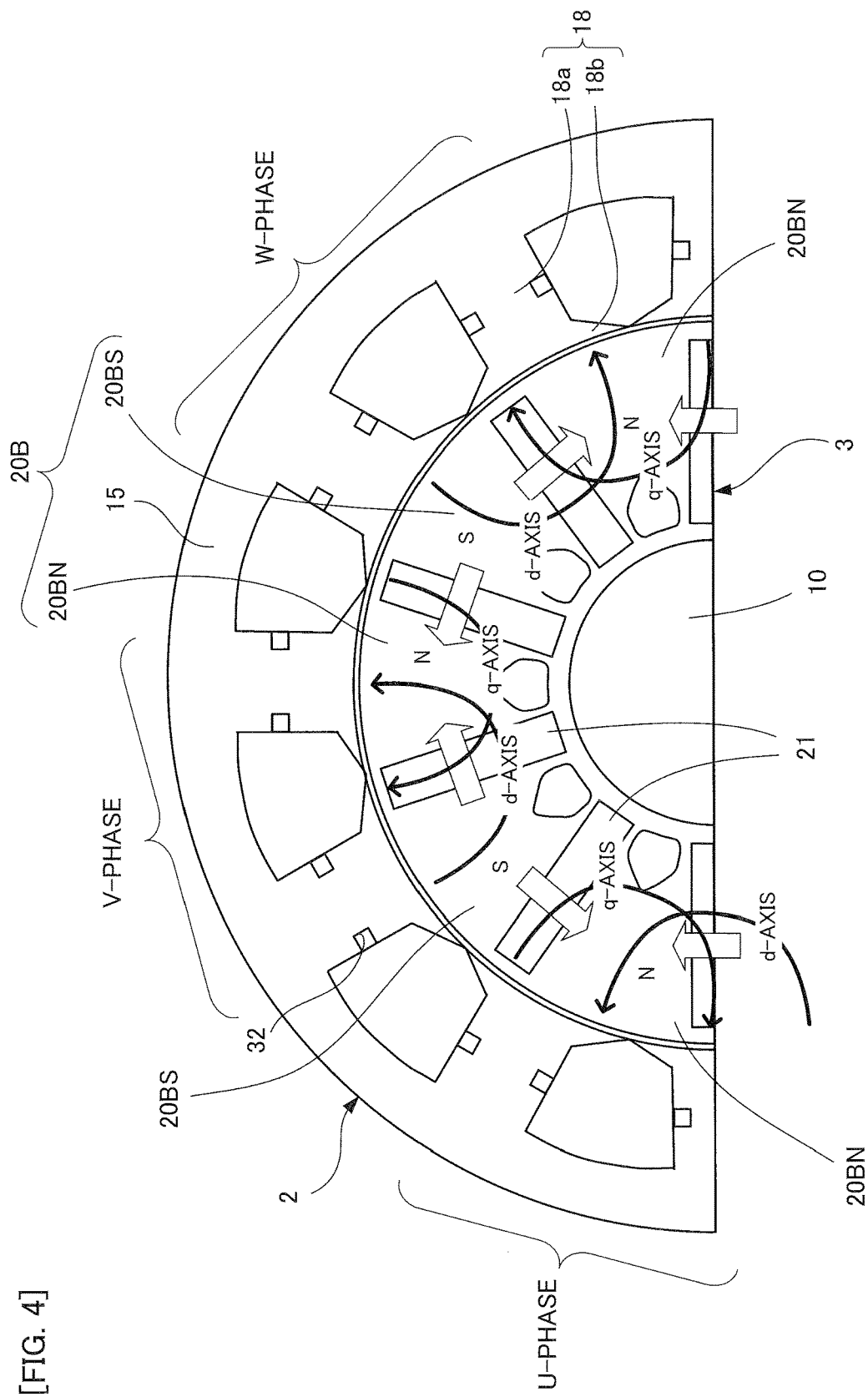
[FIG. 4]

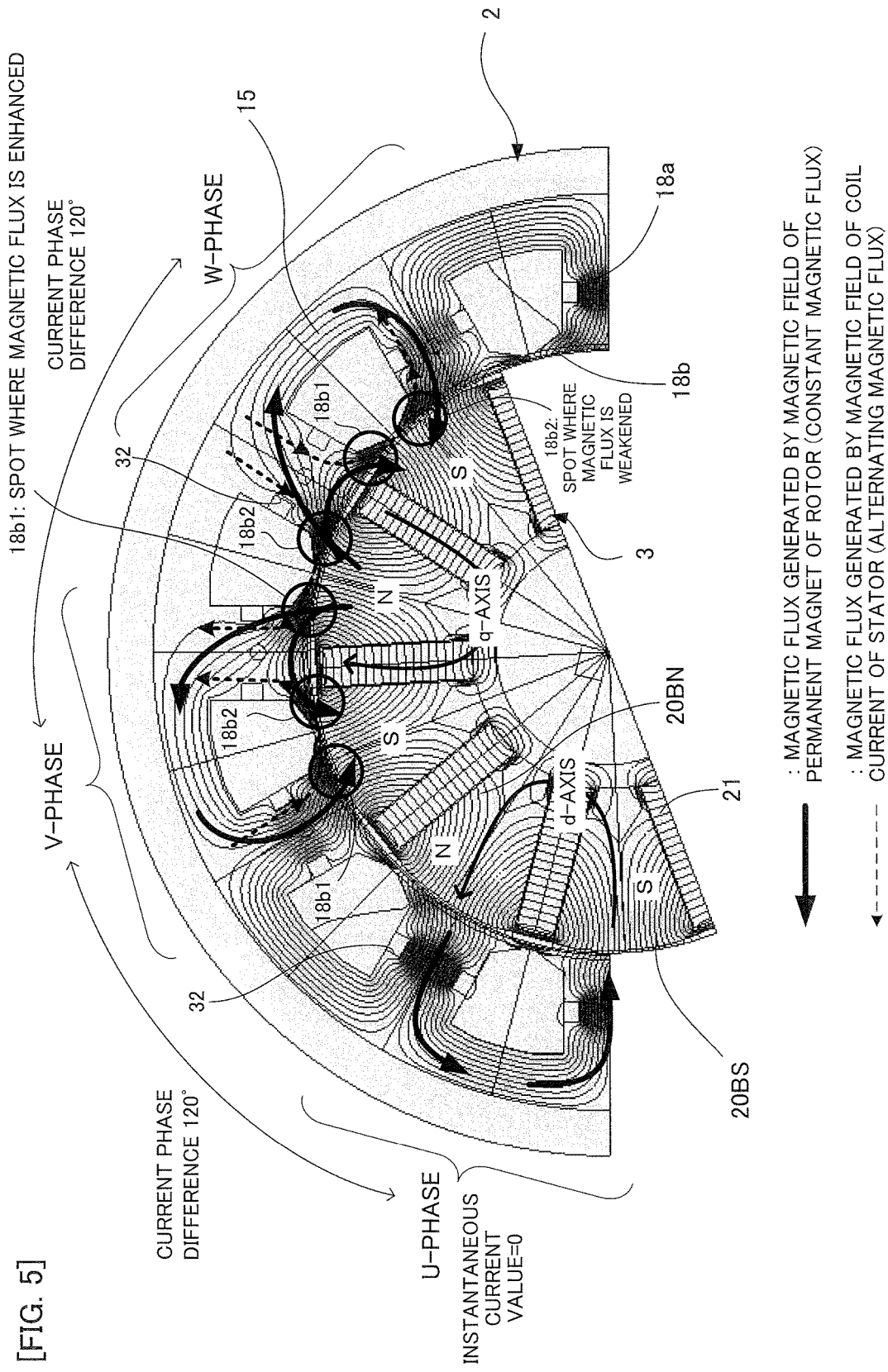

[FIG. 6]
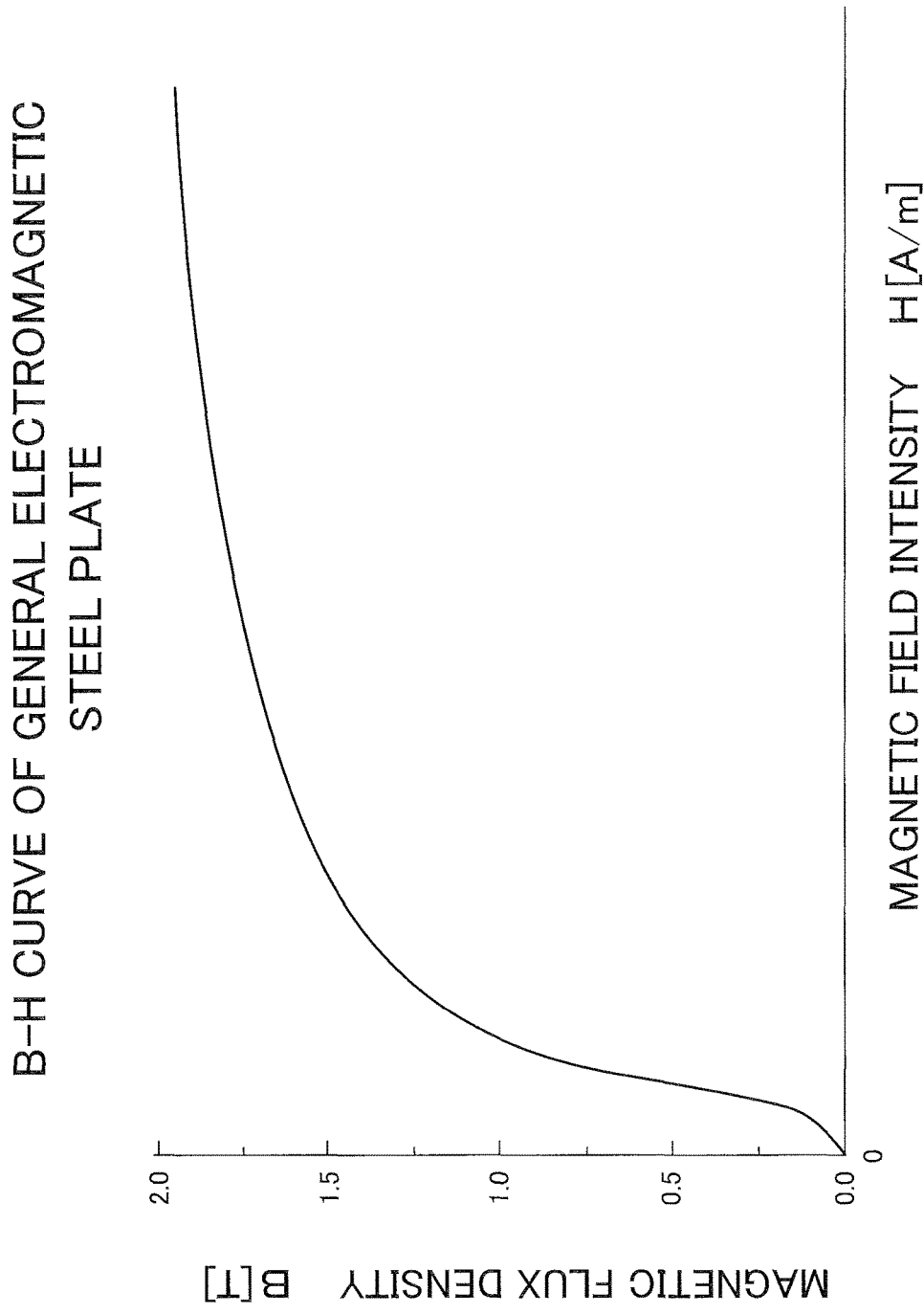

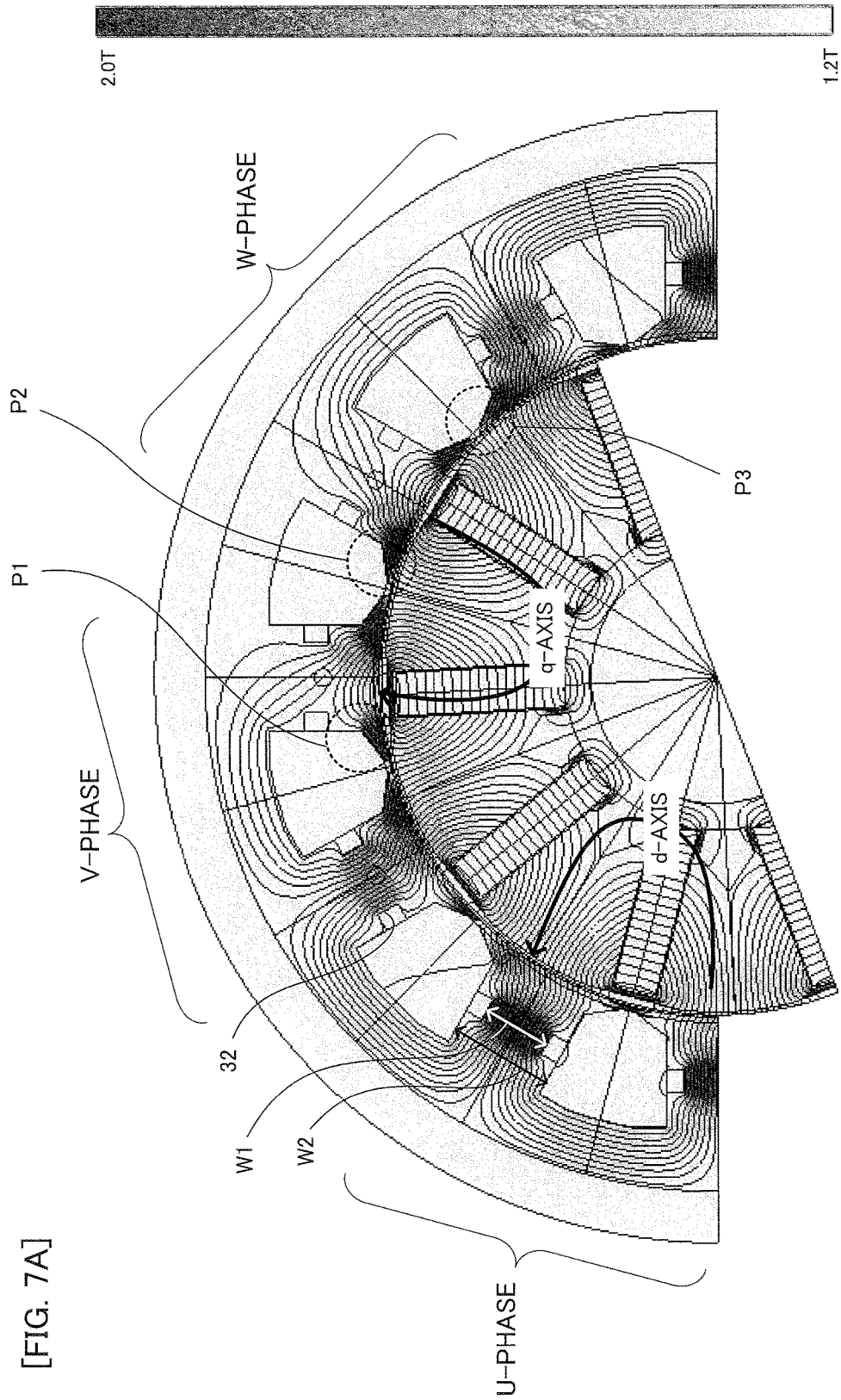
[FIG. 7A]

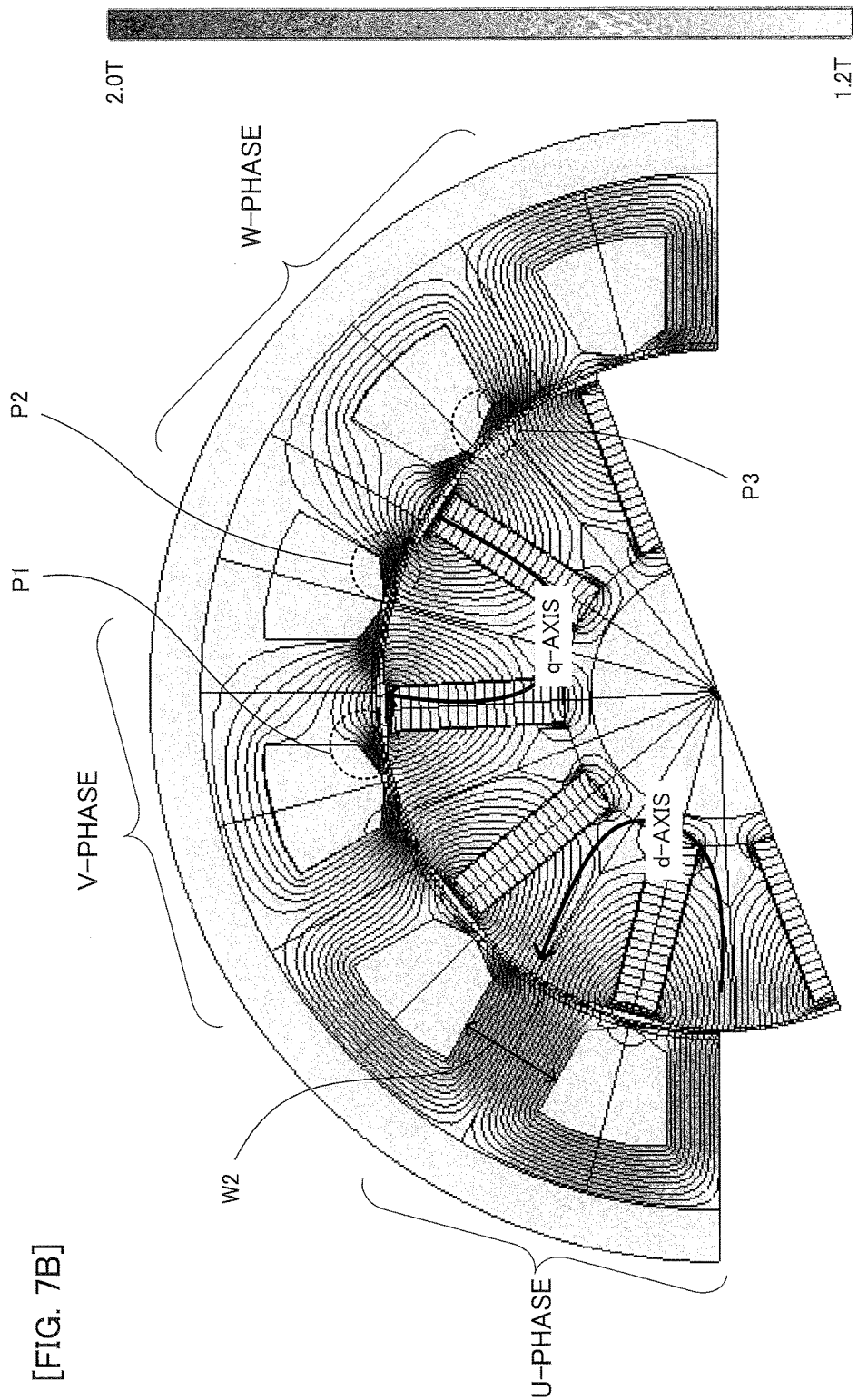
[FIG. 7B]
COMPARATIVE EXAMPLE: 0% RATED LOAD ALTERNATING CURRENT

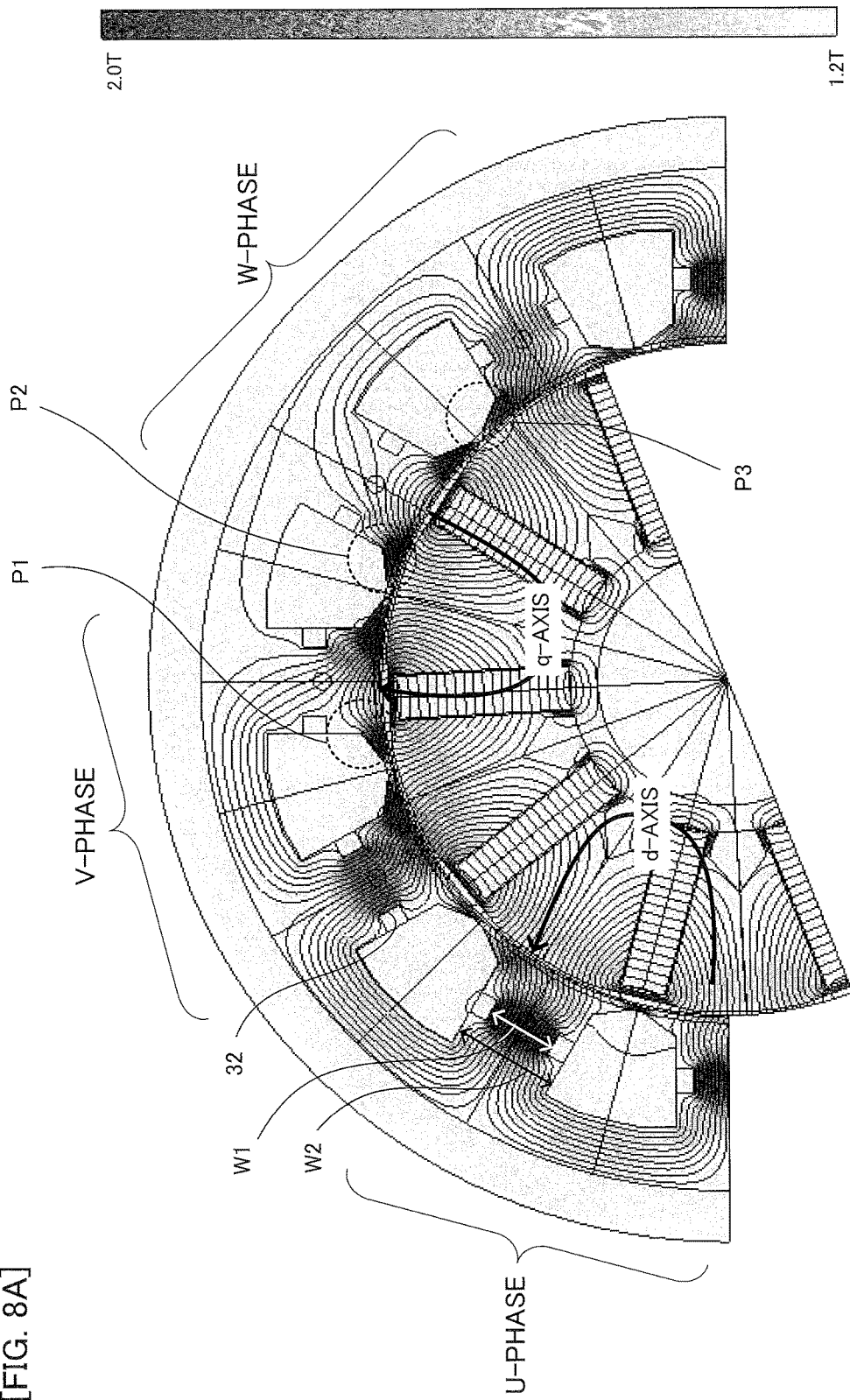

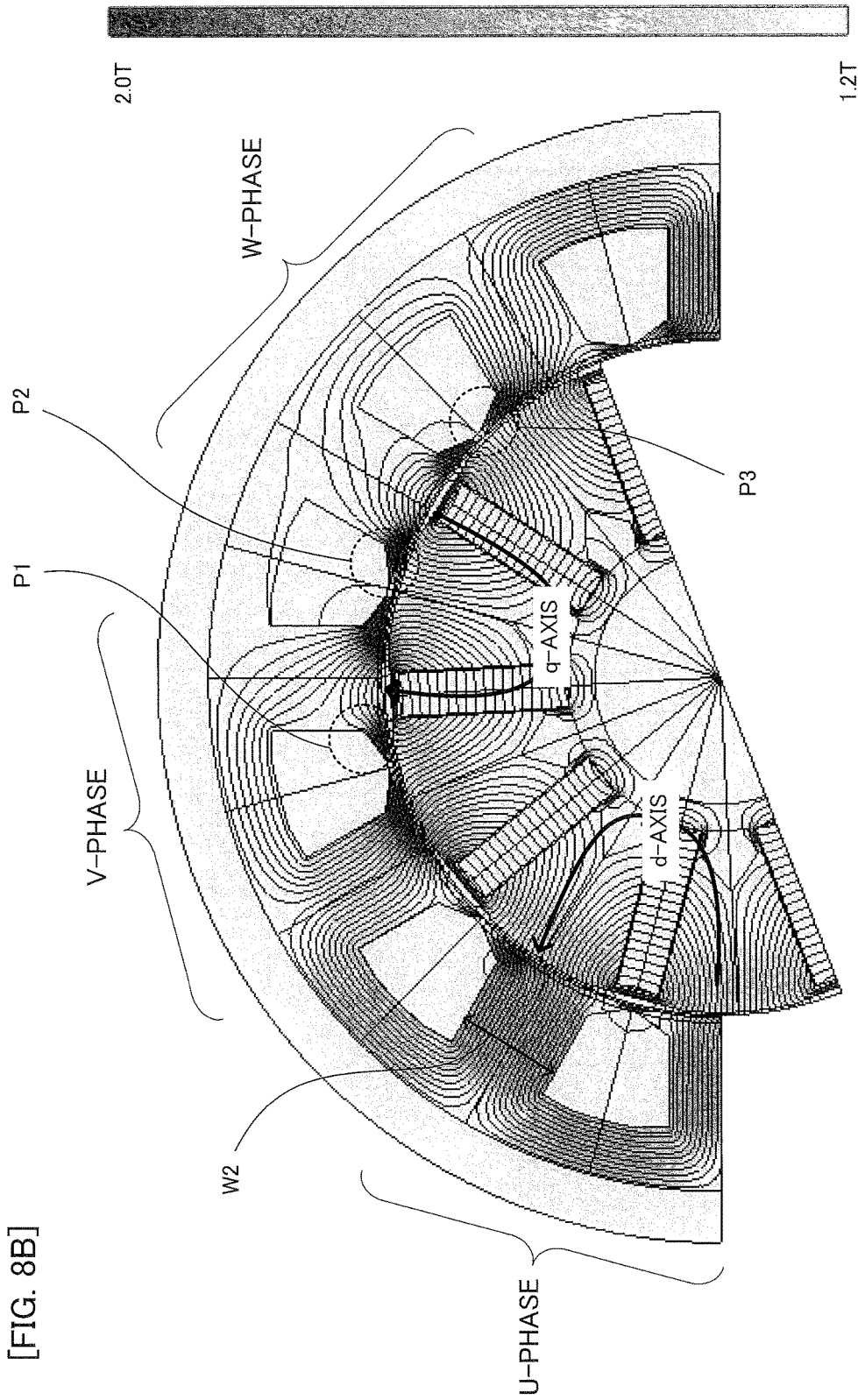
[FIG. 8B]

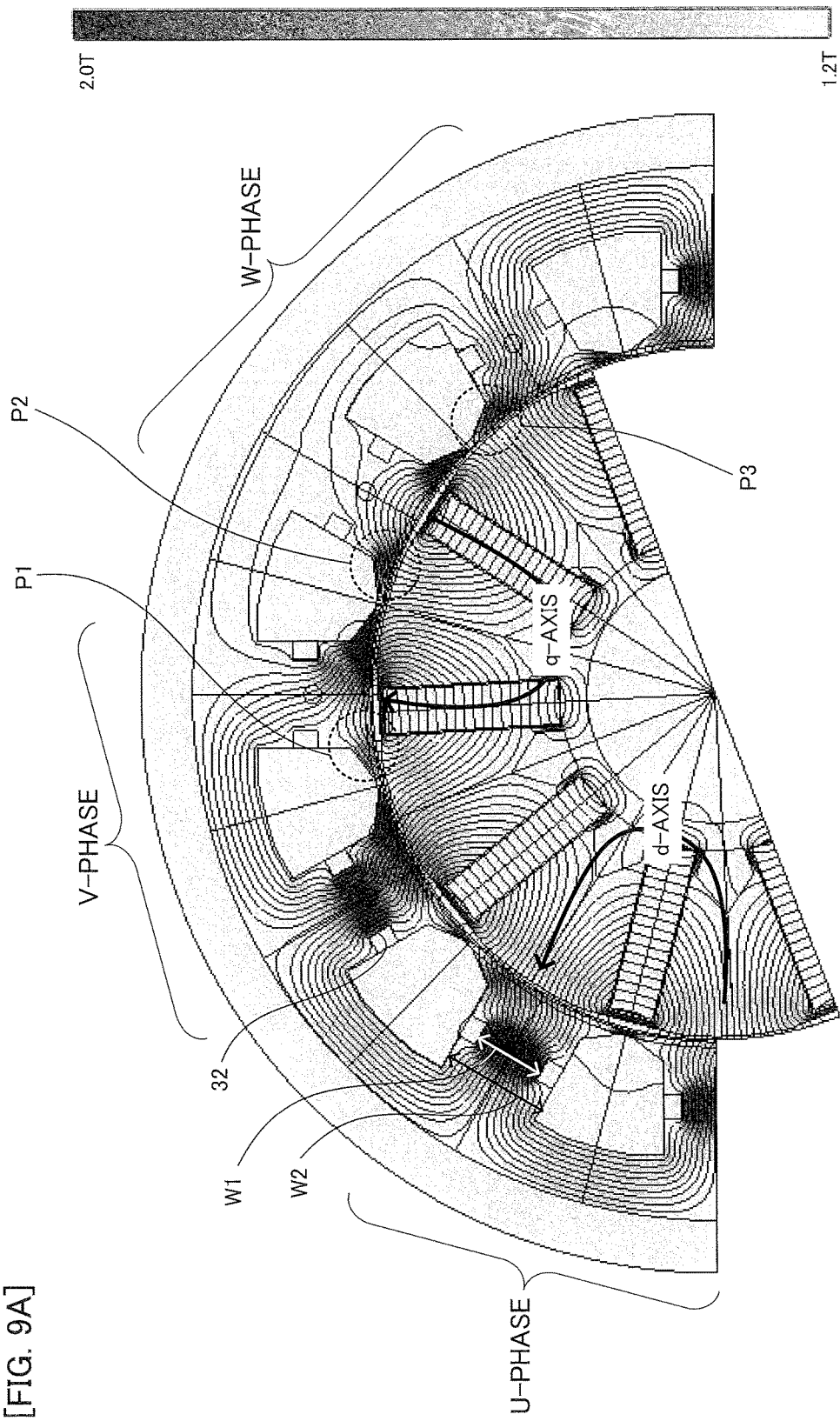

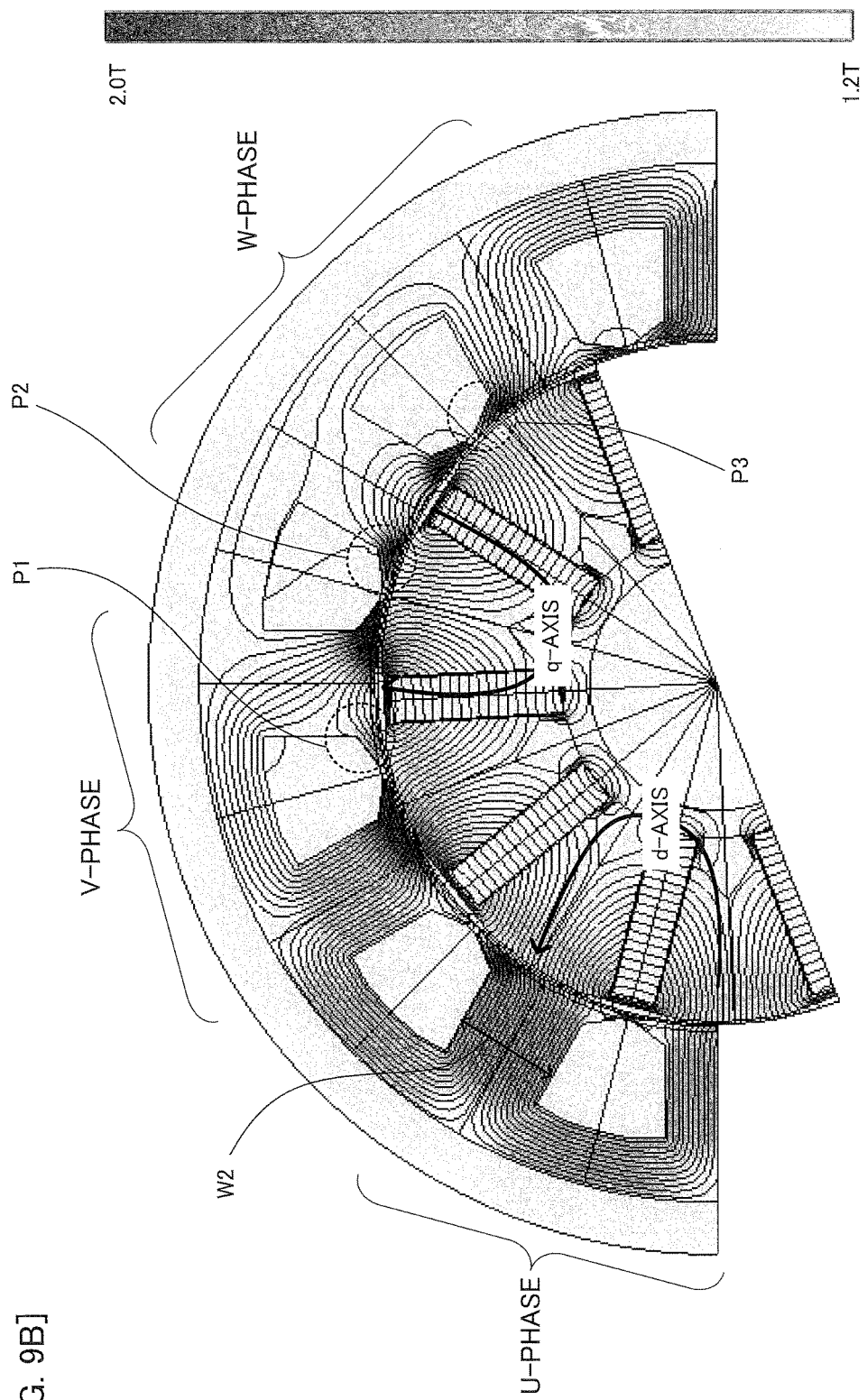
[FIG. 9B]

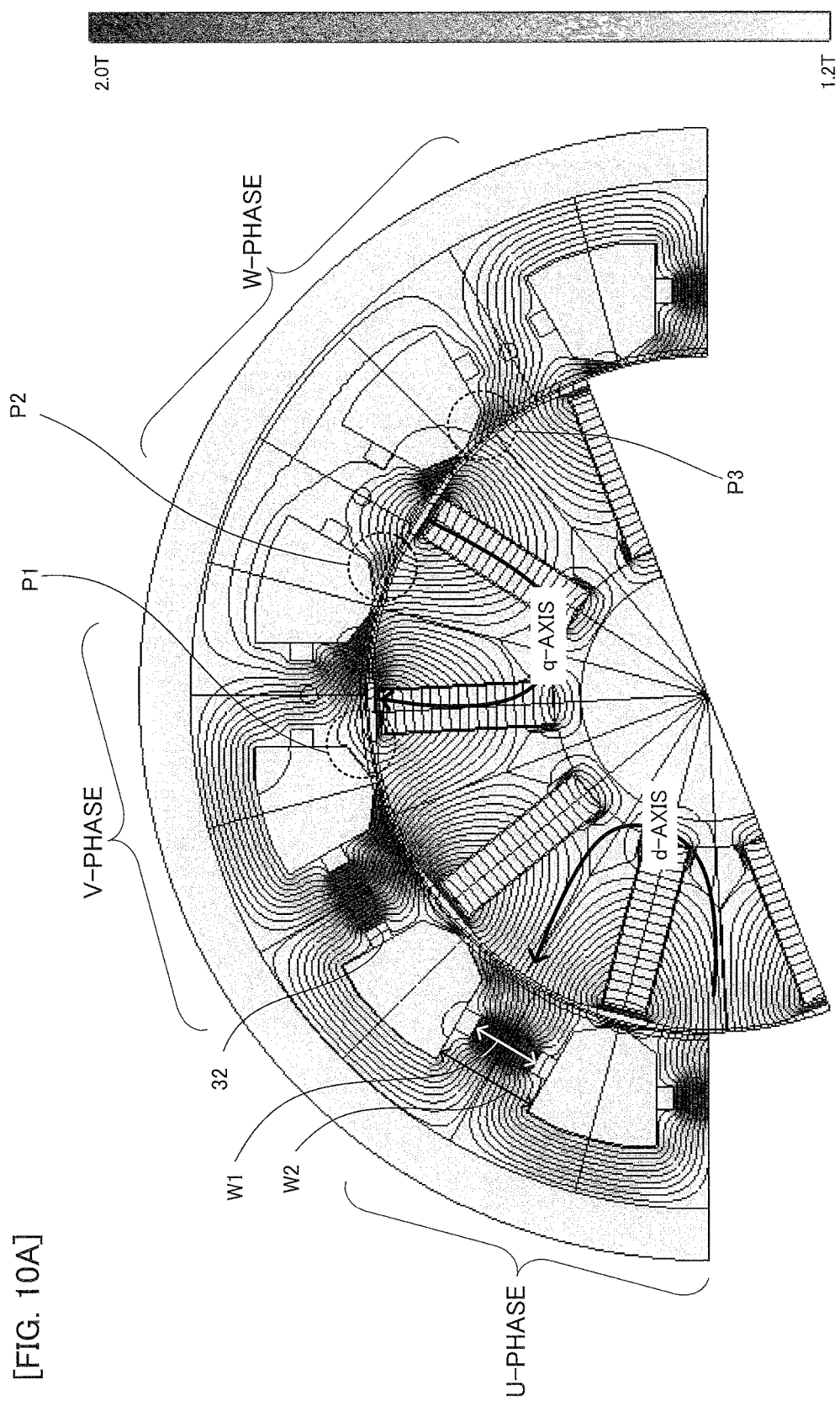

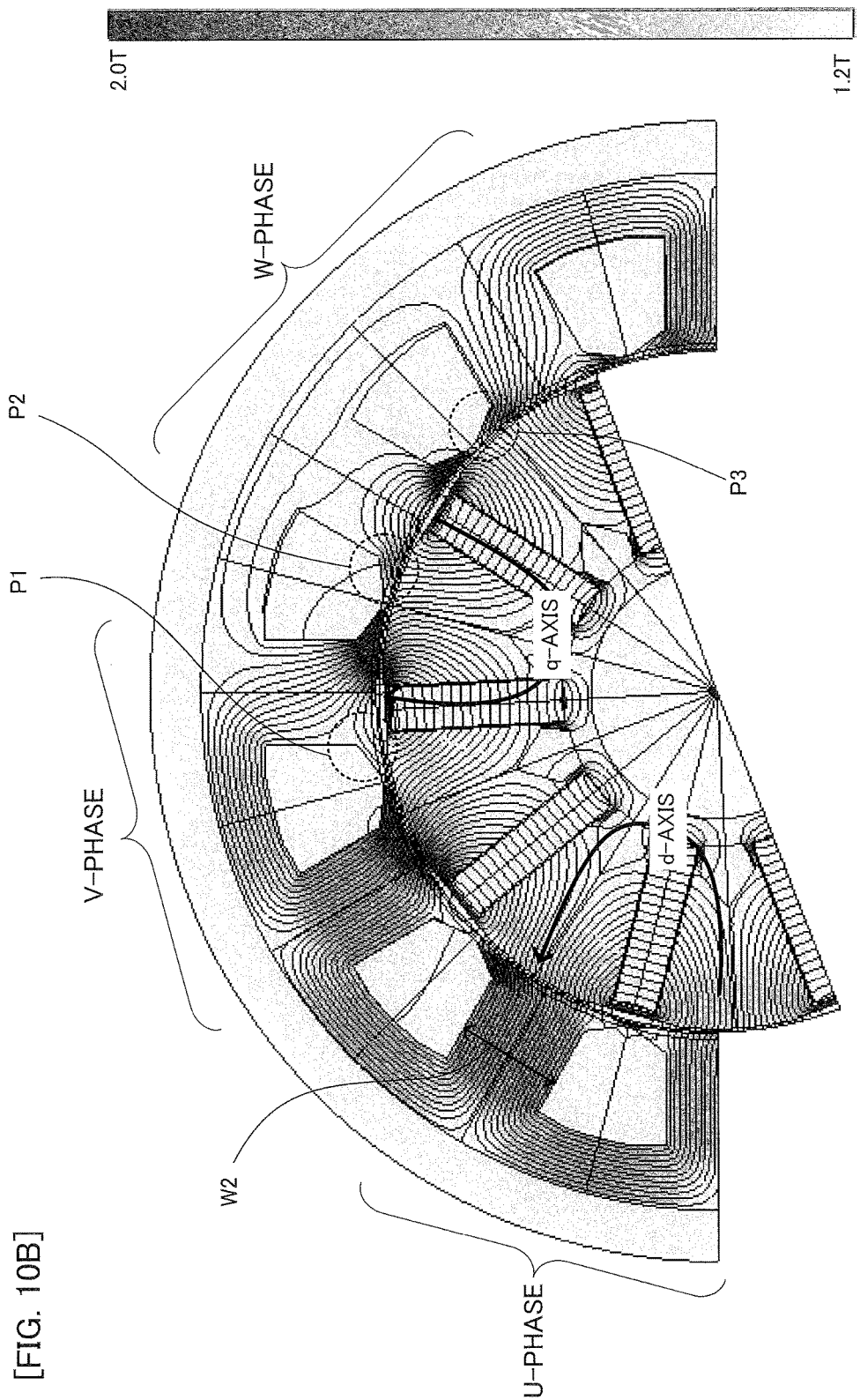

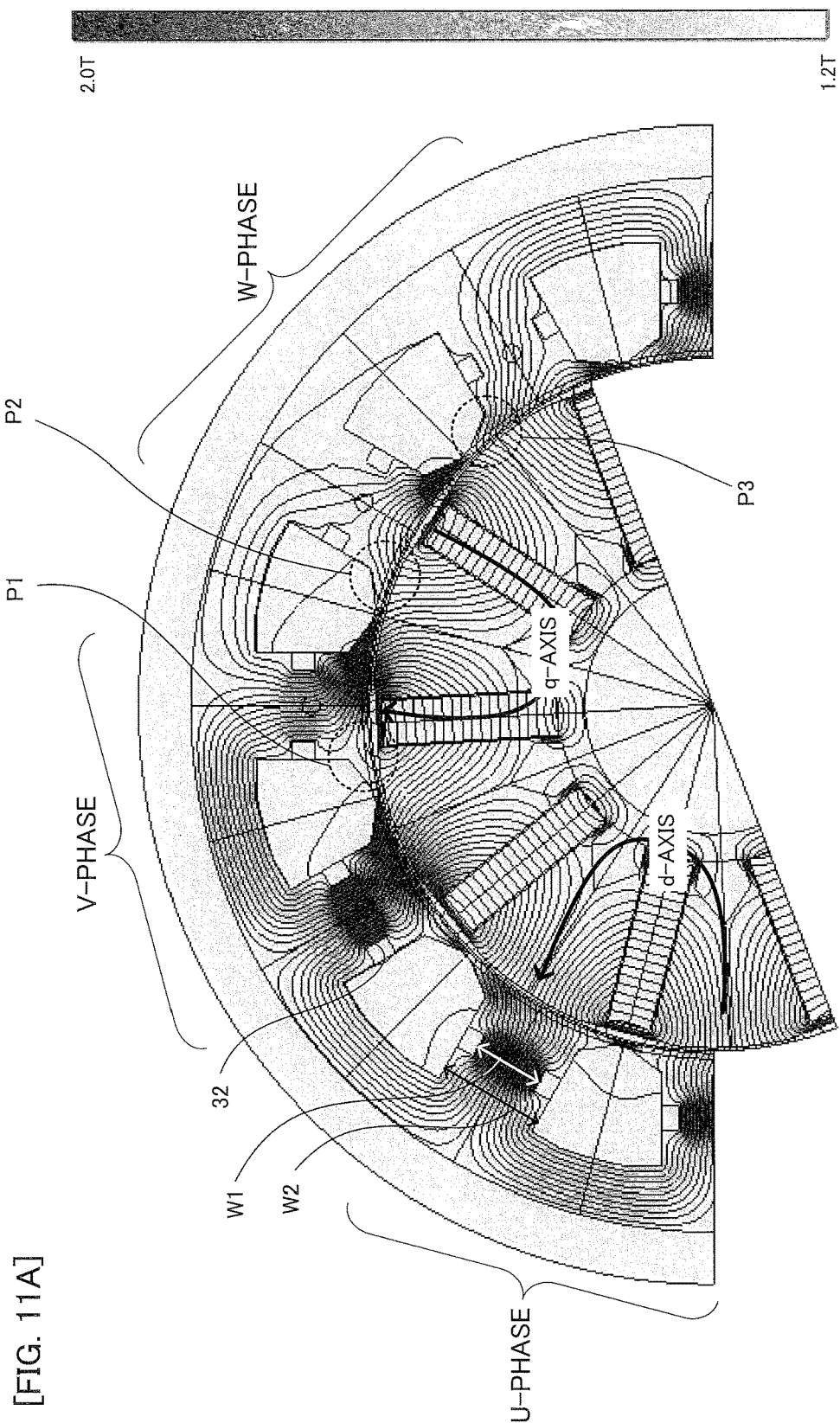
[FIG. 11A]

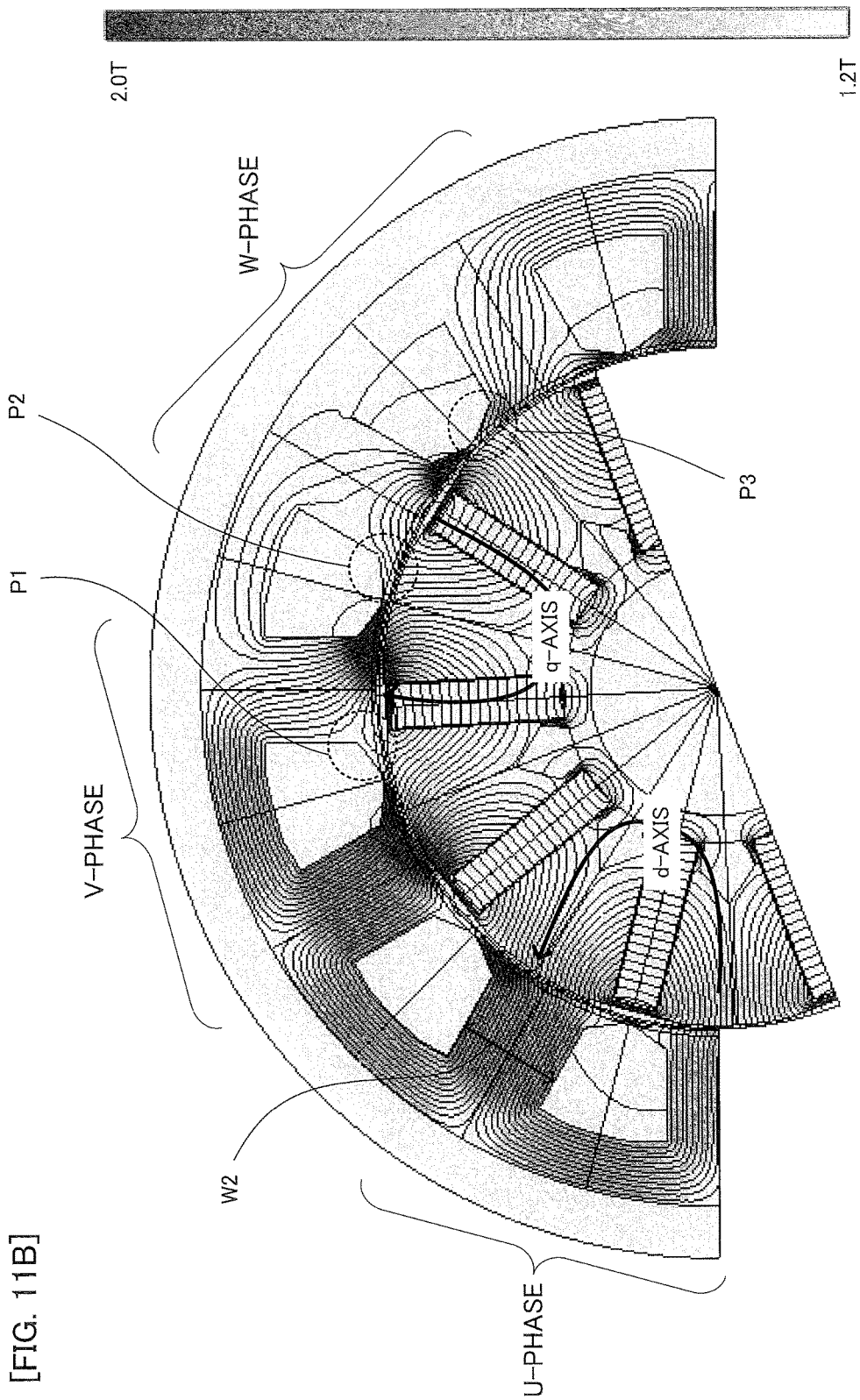
[FIG. 11B] COMPARATIVE EXAMPLE: 200% RATED LOAD ALTERNATING CURRENT

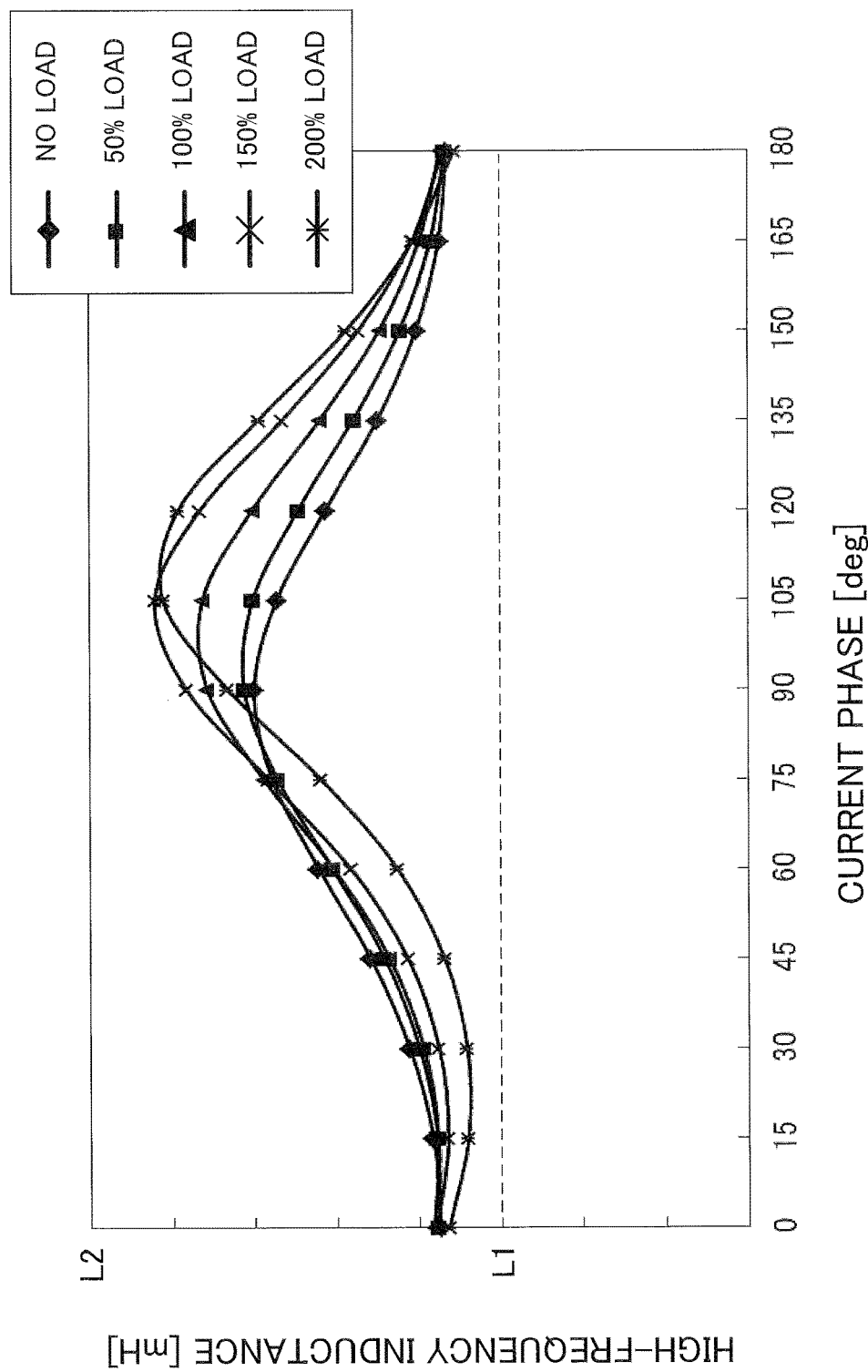
[FIG. 12]

[FIG. 13]
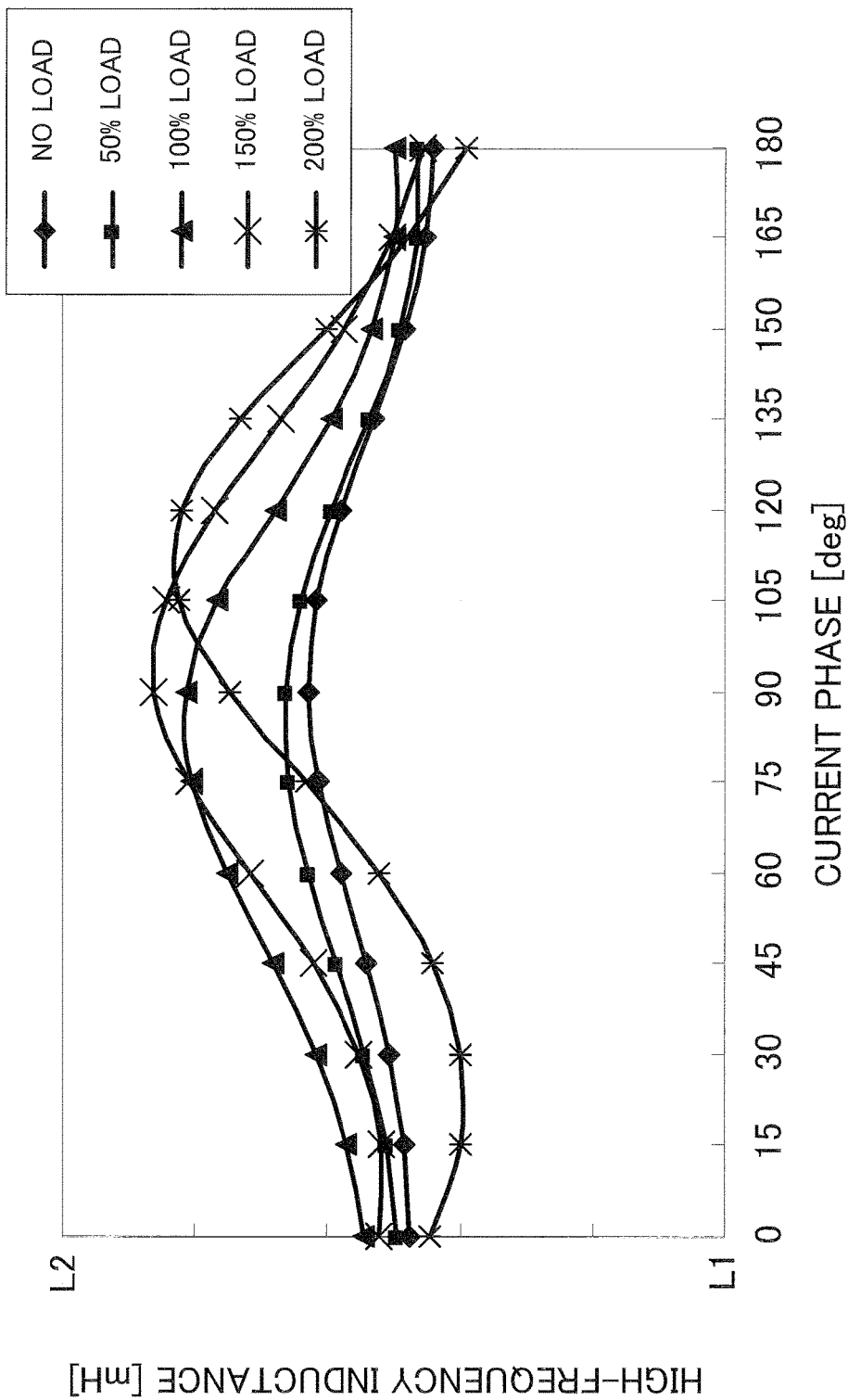

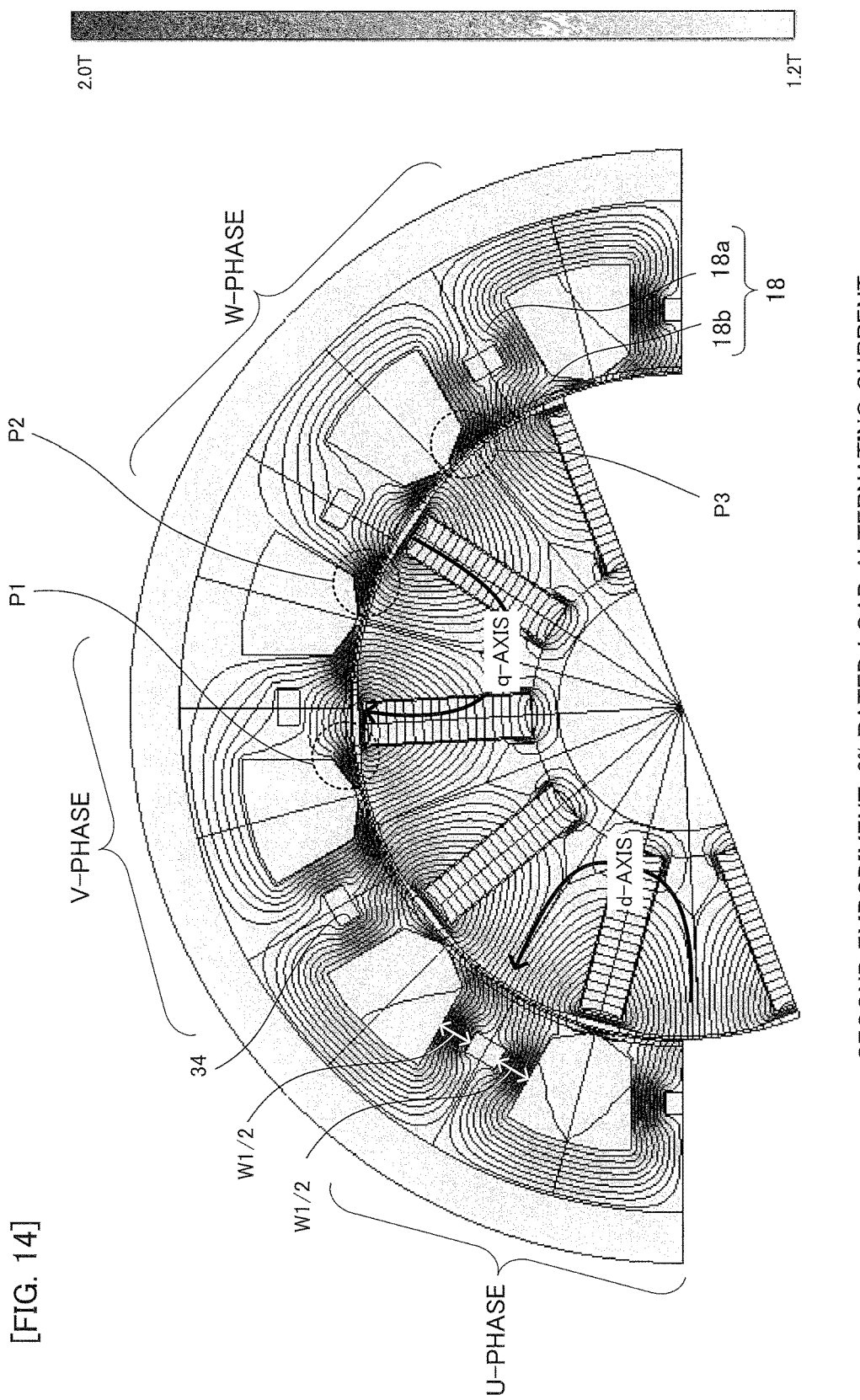
[FIG. 14]

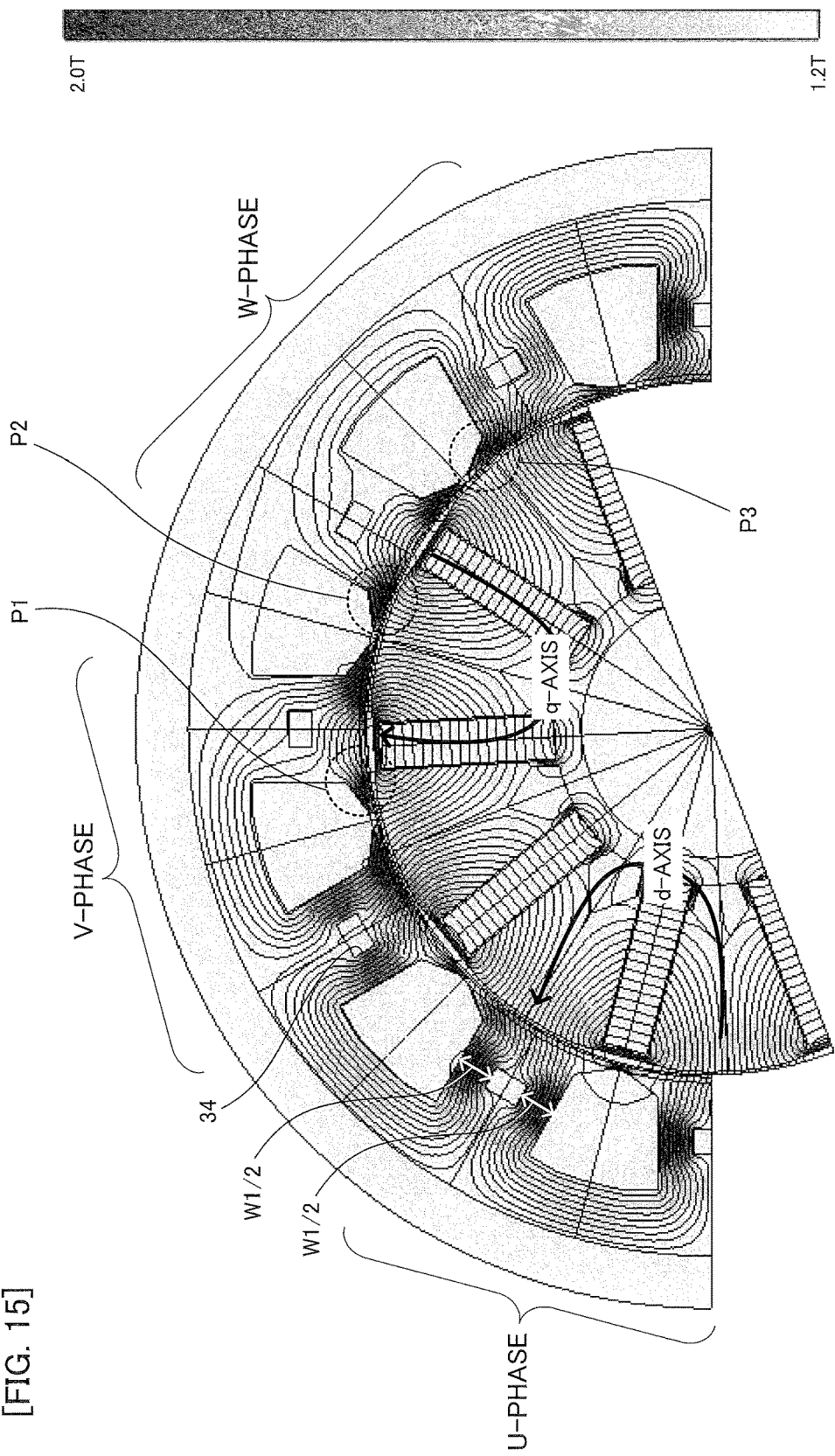

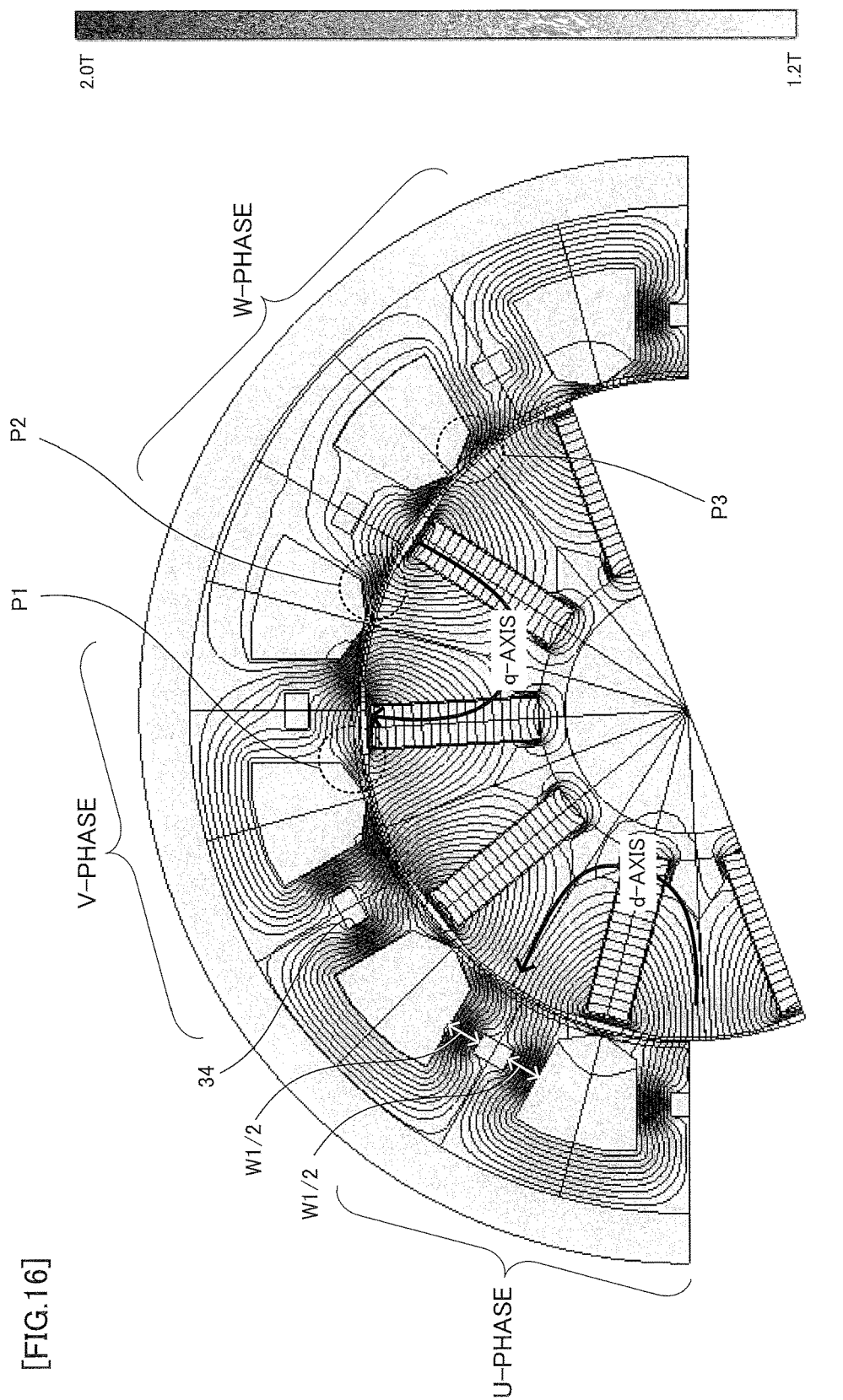
[FIG.16]

[FIG. 17]
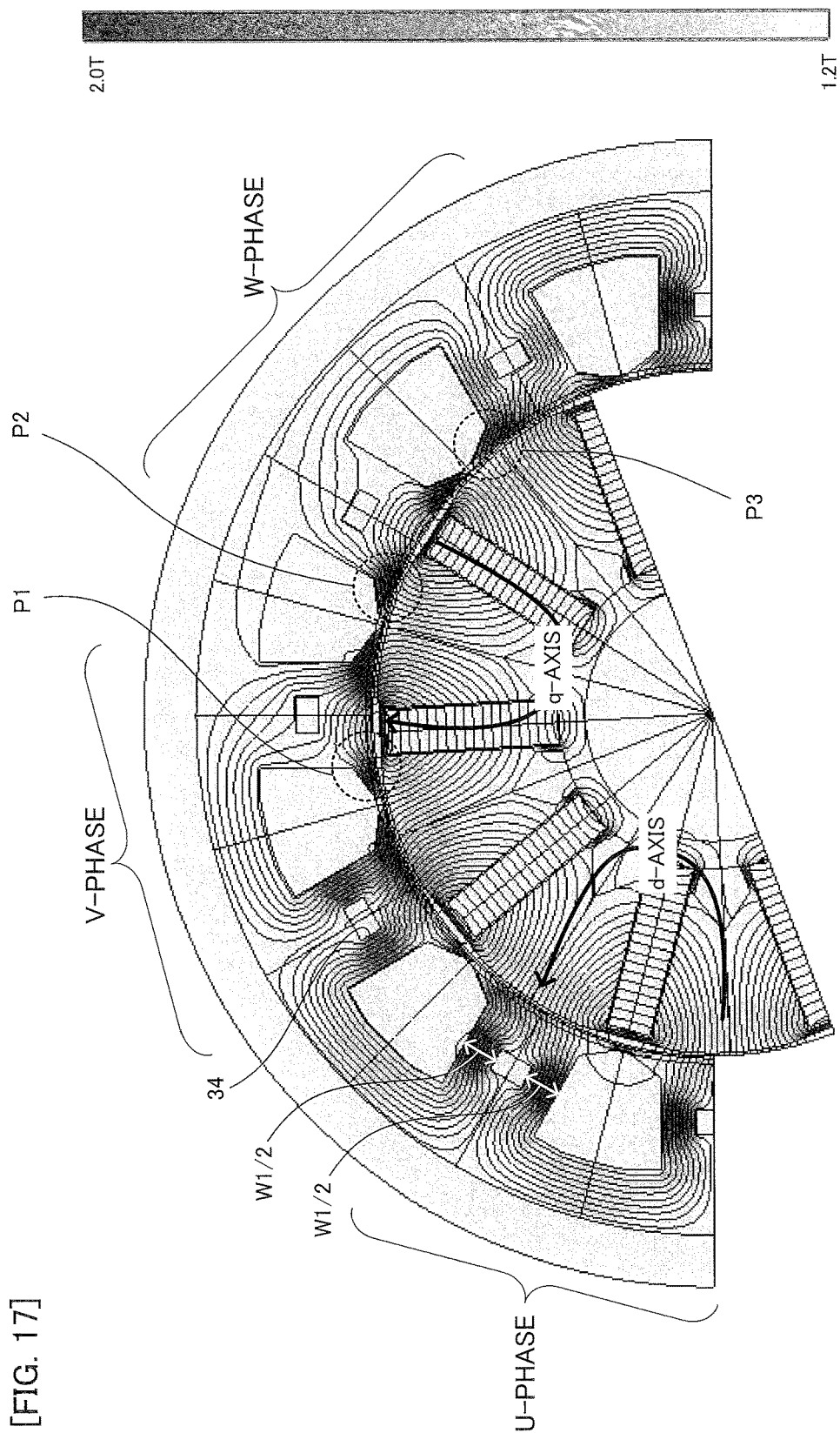

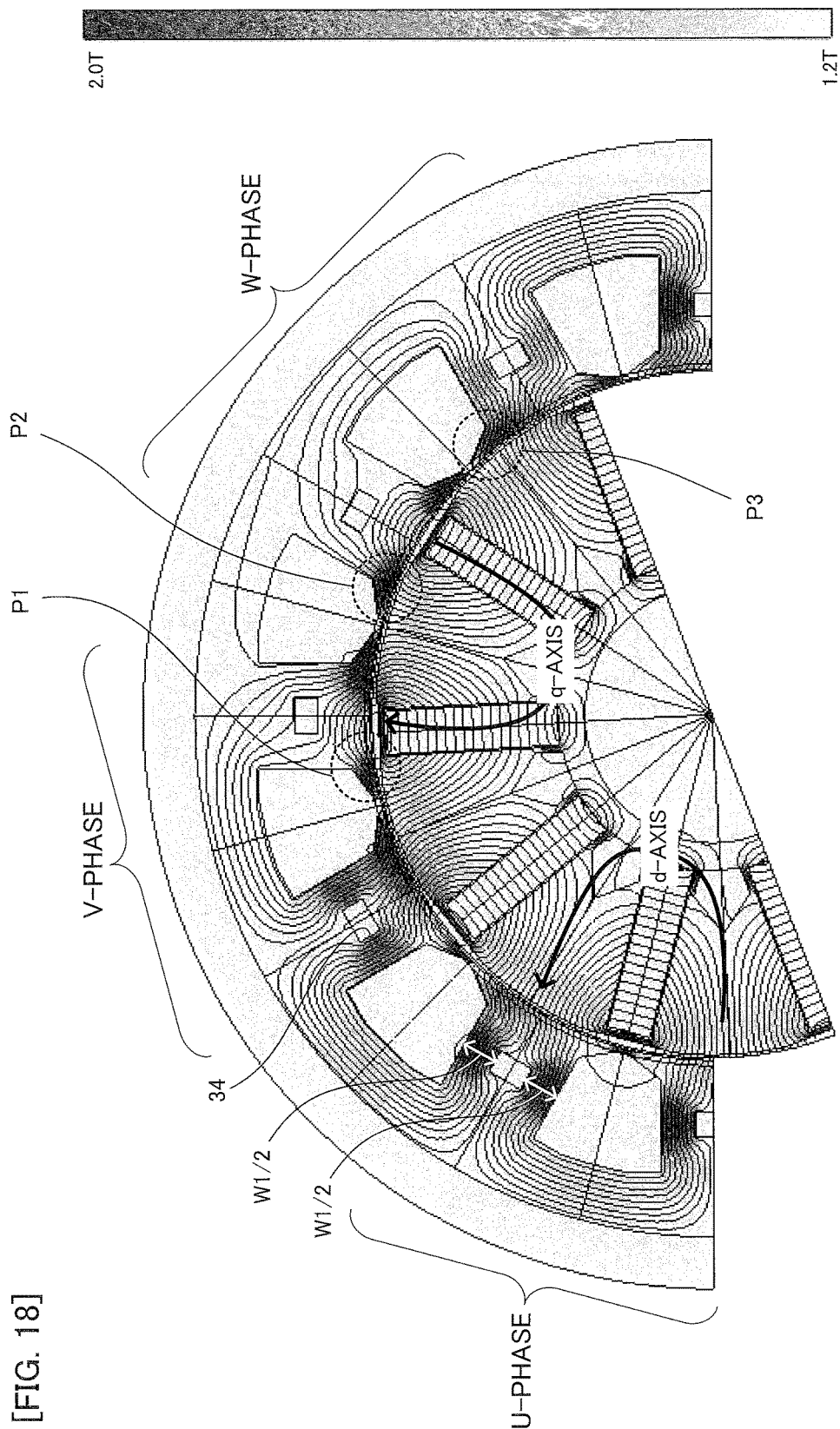
[FIG. 18]

[FIG. 19]
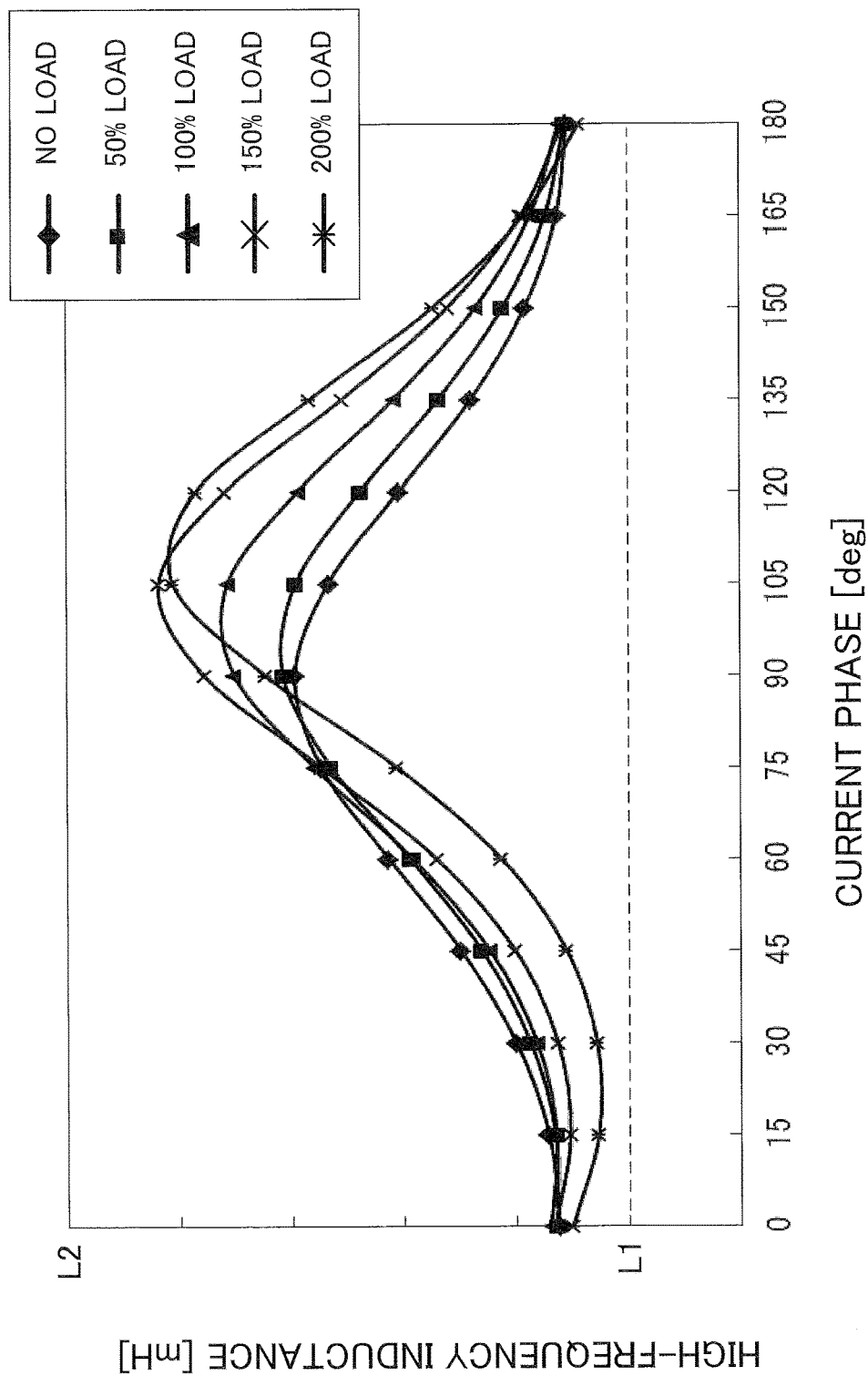

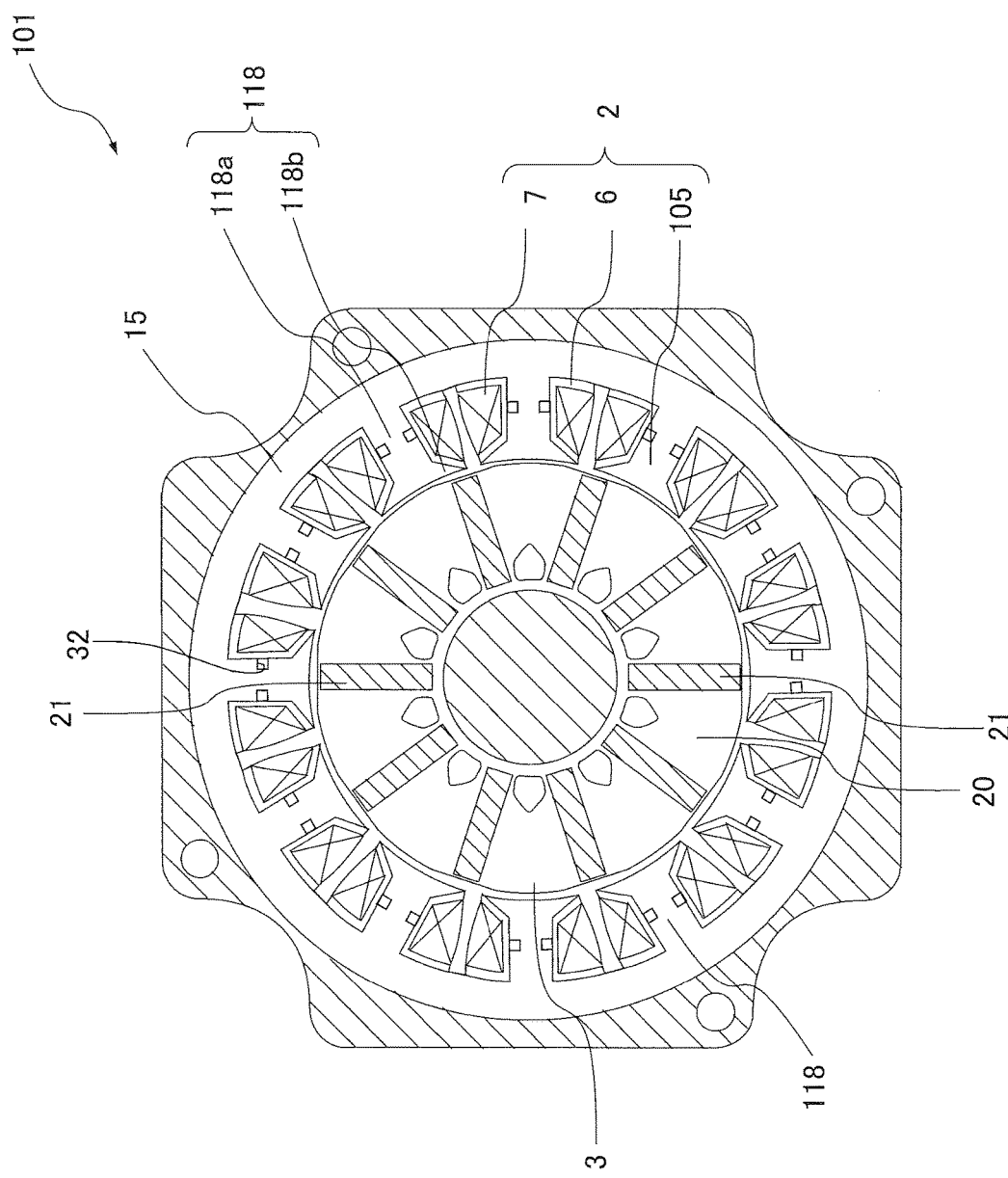
[FIG. 20]

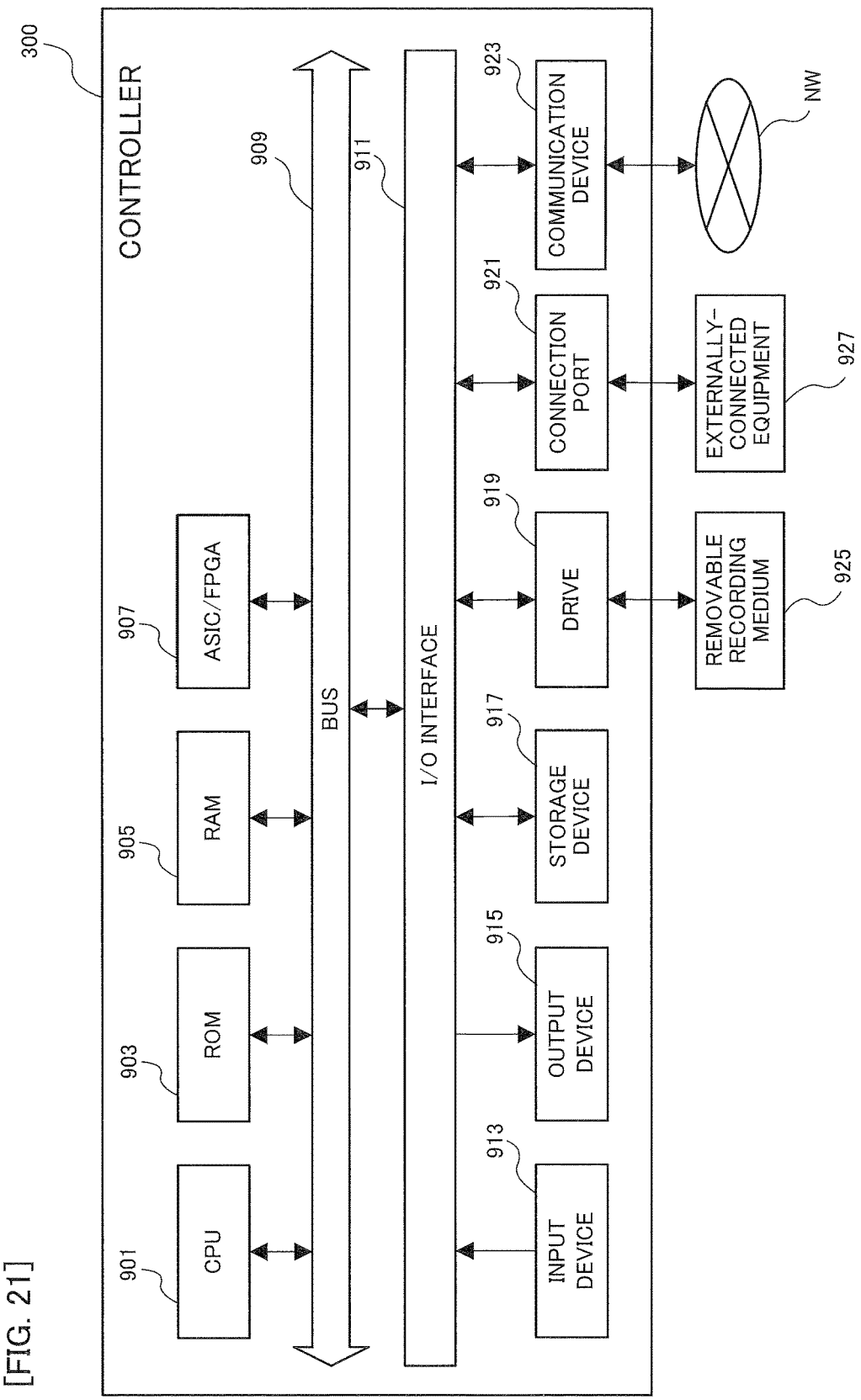
[FIG. 21]

ROTATING ELECTRIC MACHINE, ROTATING ELECTRIC MACHINE CONTROLLER AND METHOD FOR CONTROLLING ROTATING ELECTRIC MACHINE

CROSS-REFERENCE TO RELATED APPLICATION

This is a continuation application of PCT/JP2014/065246, filed Jun. 9, 2014, which was published under PCT article 21(2). The entire contents of this application are incorporated herein by reference.

BACKGROUND

Technical Field

Disclosed embodiments relate to a rotating electric machine, a rotating electric machine controller, and a method for controlling the rotating electric machine.

Description of Background Art

A controller configured to control torque, speed and position of an AC motor without using positional sensor and speed sensor is known.

SUMMARY

According to one aspect of the present disclosure, a rotating electric machine includes a stator, a rotor, and a stator core. The stator core includes a plurality of teeth. Each of the teeth includes at least one of a through hole axially piercing the tooth and a recess extending from one end of the tooth to another end of the tooth in an axial direction.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is an axial sectional view illustrating a general outline configuration of a rotating electric machine of a first embodiment;

FIG. 2 is a cross sectional view of the rotating electric machine taken along the line II-II of FIG. 1;

FIG. 3 is a control block diagram illustrating a configuration of a control system and a controller executing sensorless control according to an embodiment;

FIG. 4 is a diagram for explaining the respective magnetic pole positions of a stator and a rotor in a section orthogonal to the axial direction;

FIG. 5 is a diagram illustrating generation distribution of the respective magnetic fluxes of the stator and the rotor in the section orthogonal to the axial direction;

FIG. 6 is a graph illustrating a B-H curve of a general electromagnetic steel plate;

FIG. 7A is a diagram illustrating magnetic flux distribution of the first embodiment in a no-load state;

FIG. 7B is a diagram illustrating magnetic flux distribution of a comparative example in a no-load state;

FIG. 8A is a diagram illustrating magnetic flux distribution of the first embodiment in a 50% load current state;

FIG. 8B is a diagram illustrating magnetic flux distribution of the comparative example in a 50% load current state;

FIG. 9A is a diagram illustrating magnetic flux distribution of the first embodiment in a 100% load current state;

FIG. 9B is a diagram illustrating magnetic flux distribution of the comparative example in a 100% load current state;

FIG. 10A is a diagram illustrating magnetic flux distribution of the first embodiment in a 150% load current state;

FIG. 10B is a diagram illustrating magnetic flux distribution of the comparative example in a 150% load current state;

FIG. 11A is a diagram illustrating magnetic flux distribution of the first embodiment in a 200% load current state;

FIG. 11B is a diagram illustrating magnetic flux distribution of the comparative example in a 200% load current state;

FIG. 12 is a graph illustrating an actual measurement result of high-frequency inductance when a search signal is superposed and inputted in the first embodiment;

FIG. 13 is a graph illustrating an actual measurement result of high-frequency inductance when a search signal is superposed and inputted in the comparative example;

FIG. 14 is a view illustrating a magnetic flux distribution according to a second embodiment in a no-load state;

FIG. 15 is a view illustrating a magnetic flux distribution according to the second embodiment in a 50% load current state;

FIG. 16 is a view illustrating a magnetic flux distribution according to the second embodiment in a 100% load current state;

FIG. 17 is a view illustrating a magnetic flux distribution according to the second embodiment in a 150% load current state;

FIG. 18 is a view illustrating a magnetic flux distribution according to the second embodiment in a 200% load current state;

FIG. 19 is a graph representing measurement results of high frequency inductance derived from superimposed input of exploration signals in the second embodiment;

FIG. 20 is a cross sectional view of the rotating electric machine as a modified example configured to have tip ends of adjacent widened parts of the stator core apart from each other without being in contact; and FIG. 21 is a block diagram representing an example of the hardware structure of the controller.

DETAILED DESCRIPTION OF THE EMBODIMENTS

1. First Embodiment

Hereinafter, a first embodiment will be described referring to the drawings.

<1-1. Overall Structure of Rotating Electric Machine>

First, referring to FIGS. 1 and 2, a structure of a rotating electric machine 1 according to the first embodiment will be described. As illustrated in FIG. 1, the rotating electric machine 1 includes a stator 2 and a rotor 3, and is formed, for example, as an inner rotor type motor having the rotor 3 disposed inside the stator 2. Further, the rotating electric machine 1 is, for example, so-called a three-phase AC motor employed for sensorless control, configured to detect and control the magnetic pole position through electric process instead of using the mechanical sensor such as the encoder (the sensorless control will be described in detail later referring to FIG. 3). The stator 2 is disposed on the inner circumferential surface of a frame 4 via a cylindrical yoke 15 so as to radially face the rotor 3. The stator 2 includes a stator core 5, a bobbin 6 attached to the stator core 5, and a coil winding 7 (an embodiment of a stator winding) wound around the bobbin 6. The bobbin 6 includes of an insulation material for electrically insulating the stator core 5 and the coil winding 7. A substrate 8 is disposed on one side of the bobbin 6 in the axial direction (left side of FIG. 1), and the circuit mounted on the substrate 8 is electrically coupled with the coil winding 7 wound around the bobbin 6 via two square-bar-like pin terminals 9. An end 7*a* of winding start/end of the coil winding 7 is wound around the corresponding pin terminal 9, and fixed by soldering, or the like (not shown). Note that the end 7*a* of the coil winding 7 may be subjected to the connection process without using the substrate.

The rotor 3 is provided on an outer peripheral surface of a shaft 10. The shaft 10 is rotatably supported by a load-side bearing 12 in which an outer ring is fitted in a load-side bracket 11 provided on the load side (right side in FIG. 1) of the frame 4 and an opposite-load side bearing 14 in which an outer ring is fitted in an opposite-load side bracket 13 provided on the opposite-load side (the side opposite to the load side. The left side in FIG. 1) of the frame 4. Moreover, as illustrated in FIG. 2, the rotor 3 is provided with a rotor iron core 20 and a plurality of permanent magnets 21 provided on the rotor iron core 20 and arranged radially around the shaft 10.

(1-2. Stator Core Structure)

The stator core 5 includes the cylindrical yoke 15, and a plurality of teeth 18 (12 in the illustrated example) arranged on the inner circumference side of the yoke 15 at equal intervals. The stator core 5 as a whole is made of so-called electromagnetic steel in this example. Each of the teeth 18 includes a body part 18*a* configured to protrude from the cylindrical yoke 15 to the inner circumferential side, and a widened part 18*b* having its circumferential dimension extended to be larger than the body part 18*a*, which is positioned at the tip end of the body part 18*a* at the inner circumferential side. The widened parts 18*b* are interconnected through adjacent teeth 18. In other words, the stator core 5 includes the cylindrical yoke 15 and the plurality of connected teeth 18 in a cylindrical connection derived from connecting the widened parts 18*b*, separably. The stator 2 is assembled by fixing the plurality of teeth 18 with cylindrical shape to the inner circumference of the yoke 15, each of which includes the bobbin 6 concentrically wound with the coil winding 7. At this time, as FIG. 2 shows, the coil layer of the coil winding 7 of the bobbin 6 attached to the respective teeth 18 is arranged, having facing sides apart from each other with a gap 19. The stator 2 assembled by fixing the plurality of cylindrical teeth 18 to the yoke 15 is attached to the inner circumferential surface of the frame 4. Subsequently, the resin is injected with pressure into the gap 19 to produce the bobbin 6, the coil winding 7, and the like, which are resin molded.

In addition, the teeth 18 includes groove-like recesses 32 each extending from one end to the other end of the stator core 5 in the axial direction. The recess 32 is formed to reduce the cross-section area of the body part 18*a* of the teeth 18 in the circumferential direction. In this example, the recesses are arranged to be at the same radial positions on both side surfaces of the body part 18*a* in the circumferential direction (see also FIGS. 4, 5, and the like, to be described later). Note that, the recess 32 has a rectangular shape (seen from the axial direction) in the present embodiment, but it is not limited to the shape as described above and may have arbitrary shape such as the circular shape and the elliptical shape so long as the teeth 18 ensures to exhibit sufficient strength.

<1-3. Configuration of Rotor Iron Core>

The rotor iron core 20 has, as illustrated in FIG. 2, a cylindrical part 20A surrounding the shaft 10, a plurality of (10 pieces in the illustrated example) magnetic poles 20B provided outside in the radial direction of the cylindrical part 20A, a permanent magnet insertion hole 20*b*, and a leakage flux prevention hole 20*d*. The cylindrical part 20A has a center hole 20*a* through which the shaft 10 penetrates on its inner peripheral side.

The permanent magnet insertion hole 20*b* is provided by penetrating in the axial direction (right-and-left direction in FIG. 1) between the magnetic poles 20B on the outside in the radial direction of the cylindrical part 20A. The permanent magnet 21 is inserted in the permanent magnet insertion hole 20*b* in the axial direction and fixed by an adhesive. The permanent magnet insertion hole 20*b* extends radially from the center of the center hole 20*a* as the basis. The size of the permanent magnet insertion hole 20*b* (an area when seen from the axial direction) is substantially equal to the size of the permanent magnet 21 (a sectional area in a direction orthogonal to the axial direction). As described above in the example of the present embodiment, the rotor 3 is configured as a so-called IPM (Internal Permanent Magnet) type in which the permanent magnet 21 is embedded in the rotor iron core 20. Moreover, the permanent magnets 21 are provided in so-called I-shaped arrangement in which they are arranged in the radial direction from the vicinity of an outer periphery of the cylindrical part 20A to the vicinity of the outer periphery of the rotor iron core 20 between the magnetic poles 20B of the rotor iron core 20.

Note that the rotor 3 is not limited to the IPM type, but may be formed as so-called SPM (Surface Permanent Magnet) type having the permanent magnets 21 disposed on the surface of the rotor core 20. Further, the arrangement of the permanent magnets is not limited to the I-shape type, but may be of V-shape type, for example.

The leakage flux prevention hole 20*d* is a gap for preventing leakage flux provided between the permanent magnet insertion holes 20*b* at portions inside the radial direction in the magnetic poles 20B. The leakage flux prevention hole 20*d* suppresses leakage of flux from the permanent magnet 21 to the inside in the radial direction from the leakage flux prevention hole 20*d* and prevents reduction of the magnetic flux contributing to generation of a rotary torque.

The leakage flux prevention hole 20*d* preferably has a sectional shape pointed toward the outside in the radial direction. By forming the hole having this shape, the flux from the permanent magnets 21 located on the both sides of the leakage flux prevention hole 20*d* can be led to the outer peripheral side of the rotor iron core 20 smoothly along the pointed shape toward the outside in the radial direction, respectively. In the present embodiment, the effect can be obtained by forming the leakage flux prevention hole 20*d* having a substantially pentagonal shape. Moreover, the reduction effect of leakage flux to the inner peripheral side can be improved by reducing an interval between a side surface which is a flux generating surface of the permanent magnet 21 and a surface of leakage flux prevention hole 20*d* facing the side surface.

(1-4. Specific Example of Sensorless Control)

FIG. 3 shows an example of configuration indicating a control system 100 and a controller 300 for the rotating electric machine for speed control of the rotating electric machine 1 under sensorless control. Note that, the functional block diagram as shown in FIG. 3 is expressed in the transfer function form. Referring to FIG. 3, the control system 100 includes the rotating electric machine 1 and the controller 300. The controller 300 applies the load current to the q-axis, and high frequency voltage to the d-axis. The example implemented with the functional blocks will be described below more specifically.

The rotating electric machine controller 300 includes a subtractor 321, a vector control unit 322, a voltage control unit 323, a current detector 324, a rectangular-wave voltage generator 325, a coordinate converter 326, a magnetic-pole position calculator 327, and a speed calculator 328.

From a superior controller not shown in FIG. 3, a magnetic flux command value and a speed command value $\omega r^*$ for controlling driving of the rotating electric machine 1 are inputted into the rotating electric machine controller 300. From the speed command value $\omega r^*$, a deviation from a speed estimate value $\omega r^{\wedge}$ which will be described later is taken by the subtractor 321. This deviation and the magnetic flux command value are inputted into the vector control unit 322. The vector control unit 322 determines a magnetic flux component (d-axis component) and a torque component (q-axis component) of a motor current in the manner that the speed estimate value $\omega r^{\wedge}$ matches the speed command value $\omega r^*$ regardless of a load state and outputs a voltage command value for controlling a speed and a current of the rotating electric machine 1 as two-phase voltage command values $\Delta Vsd^*$, $\Delta Vsq^*$ in a rotary orthogonal coordinate system (d-q axis coordinate system). The voltage control unit 323 (an embodiment of a load current application part) outputs a three-phase driving voltage to the rotating electrical machine 1 on the basis of the inputted two-phase voltage command values $\Delta Vsd^*$, $\Delta Vsq^*$. As a result, the rotating electric machine controller 300 can control driving of the rotating electric machine 1 by an arbitrary speed and a torque corresponding thereto (position control is also executed but not shown).

On the other hand, from the superior controller not shown, a magnetic pole position detection control signal is inputted into the rectangular-wave voltage generator 325. The rectangular-wave voltage generator 325 (an embodiment of a high frequency voltage application part) into which the magnetic pole position detection control signal has been inputted outputs a voltage command $\Delta Vh$ and a phase command $\Delta \theta h$ at a rectangular wave voltage (an embodiment of a high frequency voltage) with an arbitrarily set time cycle. The voltage command $\Delta Vh$ and the phase command $\Delta \theta h$ are superposed on the voltage command value $\Delta Vsd^*$ in the voltage control unit 323 to apply a high frequency voltage to the d-axis. The voltage control unit 323 manipulates an amplitude and a phase of a voltage to be outputted to the rotating electric machine 1.

The current detector 324 detects a current inputted into the rotating electric machine 1 in each of the three phases iu, iv, iw. The coordinate converter 326 converts these three-phase current values iu, iv, and iw into two-phase current values is$\alpha$ and is$\beta$. These two-phase current values is$\alpha$ and is$\beta$ are current values of each axis in the orthogonal coordinate system having the u-phase as the $\alpha$-axis which is a reference axis and the $\beta$-axis orthogonal thereto. Here, if there is deviation in inductance of each of the d-axis and the q-axis of the rotating electric machine 1, that is, if the rotating electric machine 1 has a magnetic salient polarity, the amplitude of the two-phase current values is$\alpha$ and is$\beta$ includes information of a magnetic pole position $\theta$. The magnetic-pole position calculator 327 refers to the voltage command $\Delta Vh$ outputted from the rectangular-wave voltage generator 325 and calculates and outputs the magnetic pole position $\theta$ of the rotating electric machine 1 on the basis of the two-phase current values is$\alpha$ and is$\beta$. This calculation of the magnetic pole position $\theta$ may be made conforming to a known method (See JP, A, 2010-172080, for example) and detailed explanation will be omitted here.

The magnetic pole position signal $\theta$ outputted by the magnetic-pole position calculator 327 is inputted into the voltage control unit 323 and also into the speed calculator 328. The speed calculator 328 calculates the estimated speed value $\omega r^{\wedge}$ of the rotating electric machine 1 by performing differential operation of the magnetic pole position $\theta$. This speed estimate value $\omega r^{\wedge}$ is used for speed feedback control by taking deviation by subtracting from the speed command value $\omega r^*$ by the subtractor 321. Though not particularly shown, the magnetic pole position $\theta$ can be considered as a rotation position of the rotating electric machine 1 on the basis of the U-phase, and the superior controller also executes the position feedback control using this magnetic pole position signal $\theta$. As described above, in order to detect the magnetic pole position $\theta$ of the rotating electric machine 1 with high accuracy, it is required that magnetic salient polarity of the rotating electric machine 1 is high.

Note that, as described above, the rectangular wave voltage as the exploration signal is superposed on the d-axis (voltage command value $\Delta Vsd^*$), and the load AC current is input only to the q-axis component (magnetic flux component is only input to the d-axis component), but it is not limited to the configuration as described above. Although the load AC current has to be input only to the q-axis component, it is also possible to execute the superposed input of the exploration signal to the q-axis, or both d-axis and q-axis. However, superimposing of the high frequency voltage signal to the q-axis may lower the voltage required for driving, and cause the torque ripple. It is therefore desirable to execute the superposed input of the exploration signal only to the d-axis as much as possible. Further, the d-axis and q-axis inductance of the rotating electric machine 1 refers to the high frequency inductance defined in accordance with the high frequency superposed voltage signal and the corresponding current rather than the inductance with respect to the basic wave current. Therefore, the high frequency inductance will be simply referred to as the inductance also in the following description.

Note that the aforementioned process executed by the voltage control unit 323, the rectangular-wave voltage generator 325, and the like, may be covered by the single processing section, for example, or by further subdivided processing sections without being limited to the example of sharing the process as described above. Furthermore, the controller 300 allows implementation only of the section for supplying driving power to the rotating electric machine 1 of the rectangular-wave voltage generator 325 by the actual apparatus. Any other functions may be implemented by the program executed by the CPU 901 (see FIG. 21) to be described later, or it is possible to implement at least a part or the whole part of the voltage control unit 323 and the rectangular-wave voltage generator 325 by the actual apparatus such as ASIC, FPGA 907 (see FIG. 21), and other electric circuit.

<1-5. Magnetic Pole Arrangement on Axial Orthogonal Section of Rotating Electric Machine>

Subsequently, magnetic pole arrangements of the stator 2 and the rotor 3 on an axial orthogonal section will be described by using FIG. 4. Since the magnetic pole arrangement on the axial orthogonal section in FIG. 2 is 180° point symmetry with respect to a rotation axis of the shaft 10, only an upper semicircular portion is illustrated in FIG. 4, and a lower half circular portion is omitted (the same applies to FIGS. 5, and 7 to 11 which will be described later). As described above, the rotating electric machine 1 of the present embodiment is configured as slot combination of so-called 10P12S (P: pole=number of magnetic poles, S: slot=number of teeth) provided with 12 teeth 18 on the entire stator 2 and 10 magnetic poles 20B on the entire rotor 3. Therefore, in FIG. 4, 6 teeth 18 are illustrated on the half circular portion on the stator 2 side, while 5 magnetic poles 20B sandwiched by 6 permanent magnets 21 are illustrated on the half circular portion on the rotor 3 side.

First, on the stator 2 side, the coil windings 7 are wound around the two adjacent teeth 18 in directions opposite to each other. The two adjacent teeth 18 form a set and correspond to the same current phase. The current phases are arranged in order of U, V, and W in a clockwise direction by the unit of set. That is, in a mechanical static coordinate having the rotation axis of the shaft 10 as an origin, the two adjacent sets of teeth 18 shifted by 60° from each other in arrangement generate an alternating magnetic field with a phase difference electrically shifted by 120° (however, the amplitude of each phase changes in accordance with movement of the d-axis and the q-axis which will be described later with rotation of the rotor 3). In the stator 2 in the present embodiment provided with 12 pieces (6 sets) of the teeth 18, two sets of the teeth 18 correspond to each of the phases U, V, and W of the supplied three-phase AC current, respectively, and the two sets are arranged at positions shifted by 180° in terms of a mechanical angle.

Subsequently, on the rotor 3 side, each of the permanent magnets 21 is magnetized in a direction (a direction of an arrow block in the figure) such that the two adjacent permanent magnets 21 facing each other substantially in the circumferential direction. As a result, the magnetic poles 20B at positions where N-poles face each other become N-type magnetic poles 20BN whose magnetic fluxes go toward the outside in the radial direction. Moreover, the magnetic poles 20B at positions where S-poles face each other become S-type magnetic poles 20BS whose magnetic fluxes go toward the inside in the radial direction. The N-type magnetic poles 20BN and the S-type magnetic poles 20BS are provided in 5 pieces each and arranged alternately in the circumferential direction of the rotor iron core 20. As described above, since the magnetic fluxes generated from the two adjacent permanent magnets 21 concentrate to one magnetic pole 20B, a magnetic force is enhanced, and at a position where the magnetic pole 20B faces the tooth 18, the tooth 18 can be sufficiently magnetically saturated.

In the magnetic pole arrangement, the d-axis is arranged in a direction from the S-type magnetic pole 20BS toward the N-type magnetic pole 20BN which are adjacent to each other so as to go across the respective center positions in the circumferential direction. That is, an axis extending from the rotation axis of the shaft 10 toward the center direction of the N-type magnetic pole 20BN becomes the d-axis, and an axis extending in a direction shifted by 90 degrees in an electric angle from the center direction of the magnetic pole becomes the q-axis. Therefore, a mechanical angular range of 72° among the three adjacent permanent magnets 21 corresponds to an electric angular range of 360° in an electrically orthogonal dq-axis coordinate. The dq-axis coordinate functions as a rotary orthogonal coordinate rotating with respect to the rotation center of the rotor 3 in the static coordinate.

Here, as described above, the U, V, and W phases on the stator 2 side are arranged at an interval of 60° in terms of a mechanical angle, and dq-axis coordinates on the rotor 3 side are arranged at an interval of 72° in the static coordinate. As described above, in the configuration in which the slot combination is 10P12S, an installation interval difference corresponding to 12° in the static coordinate is provided between the stator 2 side and the rotor 3 side.

<1-6. Magnetic Flux Distribution on Axial Orthogonal Section of Rotating Electric Machine>

FIG. 5 illustrates generation distribution of a magnetic flux in the rotating electric machine 1 with the magnetic pole arrangement as described above. FIG. 5 illustrates a state in which, during a rotating operation of the rotor 3, the center (and the q-axis across it) of one N-type magnetic pole 20BN is located in the middle between the V-phase and the W-phase, and the center (and the d-axis across it) of one permanent magnet 21 matches the center position of the U-phase (the same applies to FIGS. 7A to 11B which will be described later). Moreover, in a three-phase AC motor, an AC current having a phase difference of 120° between each of the U, V, and W-phases is applied, but FIG. 5 illustrates the magnetic flux distribution of a state in which a current instantaneous value of the U-phase is zero and an instantaneous current flows from the V-phase to the W-phase.

A principle of the present embodiment will be described below by using the magnetic flux distribution in the state of FIG. 5. As illustrated in FIG. 5, an arrangement relationship of the stator 2 and the rotor 3 in which a magnet flux of 1-phase coil becomes the maximum appears every 12° in terms of a mechanical angle (every 60° in terms of electric angle), but the principle of the present embodiment can be similarly applied to the positional relationship between them. In order to facilitate understanding of the explanation, the magnetic flux distribution in the state of FIG. 5 will be used.

Firstly, if an AC current in the phase corresponding to the coil winding 7 wound around two teeth 18 of the same group corresponding to the respective phases is made to flow on the stator 2 side, the alternating magnetic field (see thin dashed arrow in the drawing) is generated on the route on which the current passes through the body part 18a of the two teeth 18 of the group, and the widened part 18b adjacent to the yoke 15 for circulation. However, in the example described in the present embodiment, the recesses 32 are formed at both circumferential sides of the body part 18a as described above. As a result, the alternating magnetic flux generated in the alternating magnetic field circulates while passing between the two recesses 32 of the body part 18a.

On the other hand, a constant magnetic flux (See a thick solid arrow in the figure) generated in the radial direction from the distal end on the outer peripheral side of each of the magnetic poles 20BN, 20BS on the rotor 3 side circulates by passing through each of the teeth 18 facing each other in the radial direction. There are mainly two passage paths in which the constant magnetic flux from each of the magnetic poles 20BN and 20BS passes through each of the teeth 18. The first passage path is a body part passage path passing so as to circulate through the body parts 18a of the two adjacent teeth 18 and the yoke 15. The second passage path is a widened part passage path passing only through the widened part 18b of one of the teeth 18 and circulating so as to leak.

Subsequently, through each of the teeth 18 on the stator 2 side, a magnetic flux obtained by combining the alternating magnetic flux generated by the AC current flowing through each of the coil windings 7 as described above and the constant magnetic flux flowing in from the magnetic poles 20BN and 20BS facing each other in the radial direction passes. Here, if directions of the alternating magnetic flux by the AC current and the constant magnetic flux by the permanent magnet 21 match each other, magnetic saturation in the teeth 18 is enhanced. If the directions of the alternating magnetic flux and the constant magnetic flux are opposite to each other, the magnetic saturation in the teeth 18 is weakened.

Meanwhile, the alternating magnetic flux is not generated in the single pair of the teeth 18 corresponding to the U-phase having the instantaneous current value set to 0. The constant magnetic flux from the two magnetic poles 20BN, 20BS which are respectively adjacent to the permanent magnet 21 corresponding to the center position of the U-phase only passes through the inside of the teeth body part 18a. However, the example described in the present embodiment has the recesses 32 formed at both circumferential sides of the body part 18a as described above. Accordingly, the constant magnetic flux from the magnetic poles 20BN, 20BS will circulate while passing between the two recesses 32 of the body part 18a. In this way, the teeth body part 18a in the direction of the d-axis arranged across the permanent magnet 21 corresponding to the center position of the U-phase, that is, the d-axis direction corresponding to the phase having the instantaneous current value set to 0 is most likely to be magnetically saturated compared with the other teeth 18. The magnetic flux generated at the superposed voltage has difficulty in passage, that is, the d-axis inductance may be lowered.

On the other hand, the constant magnetic flux from the N-type magnetic pole 20BN located in the middle between the V-phase and the W-phase branches to the V-phase side and the W-phase side and further branches to the body part passage path and the widened part passage path, respectively. Here, regarding the two permanent magnets 21 on the both sides adjacent to the N-type magnetic pole 20BN, the respective circumferential positions are located at substantially the center position of the widened part 18b. Thus, in the constant magnetic flux respectively branching to the V-phase side and the W-phase side, the magnetic flux can concentrate on the widened part passage path more easily than the body part passage path (the ratio which becomes a leakage flux is larger). That is, in the periphery of the q-axis arranged across the V-phase and the W-phase, magnetic flux density is higher in the widened part 18b on the inner peripheral side in the entire teeth 18, while the magnetic flux density is lower in the body part 18a.

Moreover, since the constant magnetic flux passing through the body part passage path on the V-phase side has a passing direction matched with that of the alternating magnetic flux generated in the V-phase, it tends to enhance magnetic saturation in the tooth body part 18a.

Moreover, since the passing direction of the constant magnetic flux passing through the body part passage path on the W-phase side is opposite to that of the alternating magnetic flux generated in the W-phase, it tends to weaken the magnetic saturation in the tooth body part 18a.

Each of the teeth widened parts 18b in both V-phase and W-phase a also has a spot 18b1 which will intensify the magnetic flux having the constant magnetic flux and the alternating magnetic flux in the same directions, and a spot 18b2 which will weaken the magnetic flux having the constant magnetic flux and the alternating magnetic flux in the inverse directions. In the spot 18b2 where the magnetic flux is weakened, as the load current is increased, magnetic saturation is mitigated to allow easy passage of the magnetic flux generated at the superposed voltage, that is, the q-axis inductance is increased.

In conclusion, the body part 18a of the teeth 18 in the d-axis direction is magnetically saturated as a whole by the constant magnetic flux, and the magnetic flux generated at the superposed voltage has difficulty in passage (d-axis inductance is lowered). Meanwhile, in the case of the teeth 18 close to the q-axis disposed across the V-phase and the W-phase, that is, between the two phases across which the instantaneous current value is applied, the teeth body part 18a is not magnetically saturated, and the widened part 18b is only magnetically saturated. This makes it possible to allow the magnetic flux generated by the superposed voltage to be more likely to pass compared with the teeth 18 in the d-axis direction (q-axis inductance is larger than the d-axis inductance). Furthermore, application of the load current to the q-axis generates the spot 18b2 which will weaken the magnetic flux. This further facilitates passage of the magnetic flux generated at the superposed voltage compared with the case in which the load current is not applied to the q-axis (q-axis inductance is increased).

(1-7. Influence of Recess Formation on Magnetic Pole Saliency Ratio)

Assuming that the magnetic pole saliency ratio (also referred to as "magnetic saliency ratio") of the rotor 3 is set to ρ, the q-axis inductance is set to Lq, and the d-axis inductance is set to Ld, the following relationship is established.

$$\rho = Lq/Ld \quad (1)$$

As described above, in order to detect the magnetic pole position θ of the rotating electric machine 1 with high accuracy under the sensorless control, it is necessary to set the magnetic pole saliency ratio ρ of the rotor 3 to the high value.

Here, the inductance L is defined by the following formula (2) using the magnetic flux φ and the current i. As the generated magnetic flux becomes higher with respect to the current, the inductance is increased.

$$\varphi = Li \quad (2)$$

Further, the relationship among the voltage v, the current i and the inductance L is expressed by the following formula (3), and therefore, as the inductance with respect to the constant AC voltage is reduced, the deviation of the AC current with respect to time becomes large.

$$v = d\varphi/dt = Ldi/dt \quad (3)$$

Utilizing the above-described inductance property, the rectangular wave voltage (an example of the high frequency voltage) output from the rectangular-wave voltage generator 325 is superposed on the two-phase voltage command values ΔVsd*, ΔVsq* so as to estimate the magnetic pole position θ based on the amplitude deviation of the two-phase current values isα, isβ generated by the inductance deviation between the d-axis and q-axis.

In the example of the present embodiment, the d-axis and the q-axis are arranged on five spots on the rotor 3, respectively, and the respective inductances are different depending on the arrangement relationship with the teeth 18 and the alternating magnetic flux. Among them, the teeth 18 in the d-axis direction matching the phase (U-phase illustrated in FIG. 5) in which the instantaneous current value is zero can be magnetically saturated the most easily, that is, it becomes the d-axis with the smallest inductance. Moreover, the teeth 18 in the q-axis direction of the arrangement across the two phases (the V-phase and the W-phase illustrated in FIG. 5) through which the instantaneous current value flows are magnetically saturated the least easily and become the q-axis with the largest inductance. The d-axis inductance Ld (a denominator of the formula (1)) and the q-axis inductance Lq (a numerator of the formula (1)) in the entire rotor 3 are a total amount of the d-axis inductance by 12 coils and a total amount of the q-axis inductance by 12 coils, respectively.

In order to apply a rotary torque to the rotor 3, it is only necessary that a load current of the q-axis component is applied (the d-axis component does not influence the torque). However, if the load current of the q-axis component largely increases, the magnetic saturation of the rotor core increases, and the magnetic salient pole ratio ρ caused by the rotor core shape lowers. That is, detection accuracy of the magnetic pole position θ of the rotating electric machine 1 deteriorates.

On the other hand, by using the magnetic saturation of the teeth 18 in order to improve the magnetic salient pole ratio ρ of the rotating electric machine 1, it is possible to improve the magnetic salient pole ratio ρ. That is, it is only necessary that the inductance of the d-axis matching the phase (U-phase illustrated in FIG. 5) in which the instantaneous current value is zero is further reduced, and the inductance of the q-axis of the arrangement across the two phases (the V-phase and the W-phase illustrated in FIG. 5) through which the instantaneous current value flows is further increased.

Accordingly, in the present embodiment, the respective teeth 18 are arranged so as to allow substantial magnetic saturation of the teeth 18 that radially faces the magnetic pole 20B only by the constant magnetic flux from the permanent magnet 21 in the state that the respective coil windings 7 of the stator 2 are in the non-energized state (hereinafter referred to as "no-load state"). As specific means, the recesses 32 are formed at both circumferential sides of the body part 18a of each teeth 18 so that the teeth 18 that faces the magnetic pole 20B is substantially magnetically saturated. This makes it possible to reduce the circumferential width W1 (see FIG. 7A and the like) of the teeth 18 at the area where the recesses 32 are formed as well as to decrease the cross-section area. The circumferential dimension of the recess 32 is set so that the teeth 18 that radially faces the magnetic pole 20B is substantially magnetically saturated by the permanent magnet 21 in the non-energized state of the coil winding 7. This makes it possible to increase the magnetic flux density of the area of the teeth 18 that radially faces the magnetic pole 20B by the permanent magnet 21 at the part where the recess 32 is formed in the non-energized state of the coil winding 7 so as to substantially magnetically saturate the teeth. As a result, the d-axis inductance may be suppressed to the small value.

An electromagnetic steel plate constituting the tooth 18 in general has magnetic saturation properties indicated by a B-H curve in FIG. 6. That is, if the magnetic field strength applied to the electromagnetic steel plate gradually increases from zero, while the magnetic field strength is low, the magnetic flux density rises substantially in proportion with that. However, if the magnetic field strength increases to some degree or more, the rise rate of the magnetic flux density lowers, and the magnetic flux density does not rise any longer in the last. In the present embodiment, a state in which the magnetic flux density reaches 1.9 T (tesla) or more is referred to as a "substantially magnetically saturated" state. The magnetic flux density in the substantially magnetically saturated state is not limited to this value but is changed as appropriate in accordance with a material constituting the tooth 18 and the like.

Moreover, a state in which the tooth 18 and the magnetic pole 20 "face each other in the radial direction" refers to a state in which at least the tooth body part 18a in the tooth 18 faces the magnetic pole 20B in the radial direction. Specifically, it means a state in which the body part 18a is within an angular range of the magnetic pole 20B in the circumferential direction.

As a result, on the d-axis matching the phase (U-phase illustrated in FIG. 5) where the instantaneous current value is zero, the facing tooth body part 18a is substantially magnetically saturated (eliminating an allowance for passage of the magnetic flux) only by the constant magnetic flux line from the permanent magnet 21, and the inductance can be minimized. That is, the total amount Ld of the inductance of the d-axis in the entire rotor 3 can be reduced. Moreover, on the q-axis of the arrangement across the two phases (the V-phase and the W-phase illustrated in FIG. 5) through which the instantaneous current value flows, the facing tooth body part 18a can weaken the magnetic saturation and increase the inductance (this point will be described in detail in FIGS. 7A to 11B later). That is, the total amount Lq of the inductance of the q-axis of the entire rotor 3 can be increased. As a result, since the denominator (Ld) on the right side of the formula (1) can be made smaller and the numerator (Lq) on the right side can be made larger, the magnetic salient pole ratio ρ of the rotor 3 can be improved.

(1-8. Comparison with Comparative Example without Recess with Respect to Magnetic Flux Distribution at Each Load)

The respective sections A of FIGS. 7 to 11 specifically represent the influence of teeth width change owing to the abovementioned recess 32 on the magnetic pole saliency ratio ρ. The respective sections A of FIGS. 7-11 correspond to the present embodiment. As described above, the recesses 32 are formed at both circumferential sides of the teeth body part 18a. The circumferential width of the teeth body part 18a at the area where the recess 32 is formed is set to W1. The width W1 is set to the value so that the teeth 18 that faces the magnetic pole 20B in the no-load state is substantially magnetically saturated only by the constant magnetic flux from the permanent magnet 21.

Meanwhile, the respective sections B of FIGS. 7-11 each corresponding to the comparative example show that the respective teeth body parts 18a do not have the recesses 32. As a result, the circumferential width of the teeth body part 18a of the comparative example is the same as a width W2 of the teeth body part 18a of the embodiment at the area with no recesses 32. In the comparative example, the teeth 18 that faces the magnetic pole 20B in the no-load state is not substantially magnetically saturated only by the constant magnetic flux from the permanent magnet 21. Further, FIGS. 7A, 7B illustrate the magnetic flux distribution in the no-load state that no AC current is applied to the stator 2, FIGS. 8A, 8B illustrate 50% rated load AC current (corresponding to the load current) state of the q-axis component (torque component), FIGS. 9A, 9B illustrate 100% rated load AC current state, FIG. 10A, 10B illustrate 150% load AC current state, and FIG. 11A, 11B illustrate 200% load AC current state, respectively. Note that, likewise the case shown in FIG. 5, each of the respective drawings shows the d-axis which minimizes the inductance, and the q-axis which maximizes the inductance.

As described above, in the comparative example, the width dimension W2 in the circumferential direction of each of the teeth body parts 18a is set to a relatively large value, and the cross-section area is set to the large value (see FIGS. 7B-11B). Accordingly, on the d-axis corresponding to the U-phase where the instantaneous current value is 0, the teeth body part 18a which faces the magnetic poles 20BN, 20BS has not been magnetically saturated yet. This allows further passage of the magnetic flux. Therefore, in the case that the load AC current is increased, the d-axis inductance varies under the influence of the alternating magnetic flux of the other V-phase and W-phase. In other words, the total amount Ld of the d-axis inductance in the entire rotor 3 as expressed in the formula (1) becomes likely to vary.

On the other hand, in the present embodiment as described above, the recesses 32 formed in the respective teeth body parts 18a allow setting of the width dimension W1 in the circumferential direction to the small value, and the cross-section area of the teeth body part 18a to the small value as well (see FIGS. 7A-11A). Thus, on the d-axis corresponding to the U-phase at which the instantaneous current value is 0, the teeth body part 18a which faces the magnetic poles 20BN, 20BS has been substantially magnetically saturated only by the constant magnetic flux lines from the permanent magnet 21. In other words, as further passage of the magnetic flux is hardly allowed, even if the load AC current is largely increased, the d-axis inductance is not influenced by the alternating magnetic flux of the other V-phase, W-phase, and is kept to the small value (the magnetic flux density is kept large). In other words, even if the load AC current is increased, the total amount Ld of the d-axis inductance in the entire rotor 3 expressed in the formula (1) is kept small.

Meanwhile, in the comparative example, as the load AC current is sequentially increased from 0% to 200%, the magnetic saturation will proceed in the V-phase and W-phase as a whole. The q-axis inductance across those phases will be comprehensively decreased.

On the other hand, in the present embodiment, as the load AC current is sequentially increased from 0% to 200%, the q-axis inductance across the V-phase and the W-phase, to which the instantaneous current value is applied will be gradually increased. This is resulting from magnifying effect for weakening the magnetic saturation at the tip end of the teeth widened part 18b as indicated by the sections P1, P2, P3 in the drawing as the increase in the load AC current. As aforementioned FIG. 5 illustrates, in the section P1, the constant magnetic flux (leakage magnetic flux) which passes through the widened part passage path around the q-axis is directed inverse to the alternating magnetic flux so that the magnetic saturation is weakened. Further, in the section P2, the constant magnetic flux which passes through the body part passage path and the widened part passage path at the W-phase side around the q-axis is directed inverse to the alternating magnetic flux so that the magnetic saturation is weakened. Furthermore, in the section P3, the constant magnetic flux which has been circulating through the body part passage path at the W-phase side to return to the magnetic pole 20BS is directed inverse to the alternating magnetic flux so that the magnetic saturation is weakened. In this way, as the load AC current is increased, the magnetic saturation will proceed at the V-phase and W-phase as a whole. On the contrary, the magnetic saturation is weakened in the sections P1, P2, P3. Therefore, the q-axis inductance is comprehensively increased in the end (see FIGS. 7A-11A). This makes it possible to increase the total amount Lq of the q-axis inductance in the entire rotor 3 expressed in the formula (1) may be increased in accordance with the increase in the load AC current.

Note that, in the comparative example also, the phenomenon that the magnetic saturation is weakened at the sections corresponding to P1, P2, P3 is observed as the load AC current is increased. However, the present embodiment is configured to form the recesses 32 so that width dimension W1 of each of the teeth body parts 18a in the circumferential direction becomes smaller than the width dimension W2, and the circumferential cross-section area is set to be small. Correspondingly, the magnetic saturation has proceeded in the teeth body part 18a in the d-axis direction, which is less likely to receive mutual interference between the d-axis magnetic flux and the q-axis magnetic flux. As described above, the comparative example is likely to lower the magnetic pole saliency ratio ρ as increase in the load AC current. On the contrary, the present embodiment ensures to set the magnetic pole saliency ratio ρ to the large value in spite of increase in the load AC current (motor load).

Note that, in the comparative example, because of large width dimension of the teeth 18, the constant magnetic flux from the permanent magnet 21 only has difficulty in substantially magnetically saturating the teeth body part 18a that faces the magnetic poles 20BN, 20BS. In such a case, application of the positive d-axis current which does not contribute to torque to the respective coil windings 7 of the stator 2 allows substantial magnetic saturation of the teeth 18 in the d-axis direction. As a result, the magnetic pole saliency ratio similar to the one derived from the present embodiment may be obtained.

Note that the recess 32 according to the present embodiment corresponds to an example of means for saturating magnetically the tooth which radially faces the magnetic pole in the non-energized state of the stator winding.

(1-9. Effect of the First Embodiment)

As described above, the rotating electric machine 1 according to the present embodiment is configured to form the recesses 32 axially extending from one end to the other end in the plurality of teeth 18 of the stator core 5, respectively, so that the following advantageous effects are obtained.

That is, the recesses 32 formed in the teeth 18 ensure to reduce each cross-section area of the teeth 18 at the area where the recess 32 is formed. As a result, it may increase the magnetic flux density generated by the permanent magnet 21 of the teeth 18 that radially faces the magnetic pole 20B at the area with the recess in the non-energized state of the coil winding 7, and substantially magnetically saturate the teeth. This makes it possible to suppress the d-axis inductance Ld to the small value.

Meanwhile, the tip end of the teeth 18 in the q-axis direction is only magnetically saturated to intensify the magnetic saturation at the position where the direction of the magnetic flux from the permanent magnet 21 is coincided with that of the magnetic flux from the load AC current (18b1 as shown in FIG. 5). On the contrary, the magnetic saturation is weakened at the point (18b2 as shown in FIG. 5, and P1, P2, P3 as shown in FIGS. 7A-11B) where directions of both the magnetic fluxes are inverse to each other. The area with weakened magnetic saturation allows passage of the magnetic flux at the superposed voltage, which increases the inductance. In the present embodiment, as the load AC current is increased, the magnetic saturation at the tip end of the teeth 18 in the q-axis direction may be mitigated. This makes it possible to increase the q-axis inductance Lq in the high load state.

As described above, it is possible to assure the magnetic pole saliency ratio ρ even in the high load state. As a result, highly accurate positional estimation may be performed even if the load torque is increased. Further, the rotor 3 does not have to be enlarged for avoiding the magnetic saturation of the rotor core 20 in the high load state, and therefore the entire size of the rotating electric machine 1 will never be increased.

FIG. 12 illustrates a simulation result of high-frequency inductance if a search signal is superposed and inputted in a state in which the load current is applied to the q-axis (a state in which a current is applied from the V-phase to the W-phase) in the present embodiment. The lateral axis in the figure indicates a superposed voltage phase over an electric angular range of 180° in the dq-axis coordinate, in which 0° corresponds to the d-axis and 90° to the q-axis. Moreover, the vertical axis in the figure indicates high-frequency inductance and corresponds to ease of passage of the high-frequency magnetic flux generated by the high-frequency voltage signal.

Referring to FIG. 12, in the case of operation at arbitrary load (arbitrary magnitude of AC load current), the d-axis high frequency inductance varies to form substantially sinusoidal wave-like curve. Resultant phases are almost consistent with one another with comparatively less shift. The ratio of the maximum value to the minimum value (maximum value/minimum value) of the sine wave corresponds to the magnetic pole saliency ratio ρ. In other words, the larger the amplitude of the sine wave becomes, the higher the magnetic pole saliency ratio ρ becomes. It is observed that the present embodiment ensures to assure sufficient magnetic pole saliency ratio ρ, as illustrated, even in the no-load state, and the magnetic pole saliency ratio ρ becomes high as the load is increased.

On the other hand, FIG. 13 corresponding to the view as described above represents the comparative example. In FIG. 13, the magnetic pole saliency ratio ρ in the no-load state is low, and hardly becomes as high as the ratio in the present embodiment in spite of increasing the load. Further, in the comparative example, as the load increases, the sine wave phase shift becomes large. This indicates insufficient magnetic saturation in the teeth 18 in the d-axis direction, which causes the magnetic flux by the q-axis current to influence the d-axis magnetic flux. Variation in the phase of sine wave curve of the d-axis inductance significantly deteriorates detection accuracy of the magnetic pole position θ of the rotating electric machine 1. As described above, the present embodiment ensures higher magnetic pole saliency ratio ρ as well as higher accuracy for detecting the magnetic pole position θ of the rotating electric machine 1 as compared with the comparative example.

In addition, the present embodiment also provides the effects as described below. For example, in the case that the width of the teeth 18 is preliminarily designed to be small, dedicated design, components and production facility are required specific to the structure, leading to significant increase in workload and cost. The present embodiment is capable of additionally forming the recesses 32 in the standard structure of the teeth 18, which makes it possible to suppress cost increase.

Furthermore, in the case that the width of the teeth 18 is preliminarily designed to be small as described above, the magnetic pole saliency ratio will be fixed to the value adapted to the teeth width. Meanwhile, the present embodiment allows adjustment of the dimension of the recess 32 upon formation thereof. This makes it possible to adjust the magnetic pole saliency ratio ρ.

Further, especially in the present embodiment, the recesses 32 are formed at the same radial positions at both circumferential sides of the teeth 18. As a result, the teeth 18 may be symmetrically shaped in the circumferential direction, ensuring to reduce cogging.

Furthermore, especially in the present embodiment, each of the teeth 18 includes the body part 18a protruding from the cylindrical yoke 15 toward the inner circumference, and the widened part 18b positioned at the tip end of the main body part 18a in the inner circumference so that the circumferential dimension is made larger than the body part 18a. The recess 32 is formed in the body part 18a. In this way, as the teeth 18 includes the widened part 18b whose dimension in the circumferential direction is enlarged so as to increase the area of the part at which the stator 2 and the rotor 3 face with each other. This makes it possible to smoothen the magnetic flux flow between the stator 2 and the rotor 3.

Moreover, especially in the present embodiment, the widened parts 18b are interconnected with adjacent teeth 18. The stator core 5 includes the cylindrically linked teeth 18, fixed to the inner circumference of the yoke 15. In this way, the interconnected widened parts 18b may serve to weaken the magnetic saturation in the sections (P1, P2, P3) of the q-axis teeth 18 where directions of the magnetic flux from the permanent magnet 21 and the load AC current are inverse to each other. This makes it possible to further increase the q-axis inductance Lq at the high load state, thus assuring the magnetic pole saliency ratio even in the high load state.

In addition, especially in the present embodiment, the permanent magnet 21 is disposed inside the rotor core 20. As a result, the configuration allows usage of the reluctance torque as the rotary power in addition to the magnet torque compared with the configuration having the permanent magnet 21 disposed on the surface of the rotor core 20. This makes it possible to realize the compact rotating electric machine with high torque.

Additionally, especially in the present embodiment, the rotor core 20 includes a cylindrical part 20A fixed to a shaft 10, having the plurality of magnetic poles 20B disposed on the outer circumference. The permanent magnets 21 are disposed between adjacent magnetic poles of the rotor core 20, from the area close to the outer circumference of the cylindrical part 20A to the area close to the outer circumference of the rotor core 20, along the radial direction while making so-called I-shape arrangement. This may ensure to increase the input amount of the permanent magnets for concentrating the magnetic flux on the magnetic pole 20B.

Further, especially in the present embodiment, the coil winding 7 is wound around the teeth 18 through concentrated winding. Generally, the distributed winding is employed for increasing the magnetic pole saliency ratio ρ; in this case, the rotating electric machine 1 is enlarged as a whole. The present embodiment ensures to have the magnetic pole saliency ratio ρ by forming the recesses 32 in the teeth 18 so as to allow employment of concentrated winding of the coil winding 7, resulting in the compact rotating electric machine 1.

Furthermore, especially in the present embodiment, the controller 300 includes the rectangular-wave voltage generator 325 for applying high frequency voltage to the d-axis, and the voltage control unit 323 for applying the load current to the q-axis. As a result, it is possible to estimate the magnetic pole position θ of the rotating electric machine 1 with variation of the inductance upon application of the high frequency voltage signal, and the rotating electric machine 1 may assure the magnetic pole saliency ratio ρ even in the high load state. Therefore, it is possible to implement the controller 300 and the control system 100 for executing highly accurate sensorless control even if the load torque of the rotating electric machine 1 is increased.

2. Second Embodiment

Next, a second embodiment will be described referring to the drawings.

(2-1. Structure of Stator Core)

As FIGS. 14 to 18 show, the rotating electric machine 1 according to the present embodiment is configured to form an axially piercing through hole 34 in the body part 18a of the teeth 18 instead of the recesses 32. Any other structure is basically the same as that of the first embodiment. Therefore, the sectional view in the axial direction, the cross-sectional view and the like for showing the rotating electric machine 1 according to the present embodiment will be omitted.

In FIGS. 14-18, the through hole 34 is formed to reduce the cross-section area of the body part 18a of the teeth 18 in the circumferential direction. In this example, it is formed at the center position of the teeth body part 18a in the circumferential direction. Note that, in the present embodiment, the through hole 34 is formed into a rectangular shape (shape seen from the axial direction), but may be formed into another shape such as circular shape, elliptical shape and the like with no limitation so long as the strength of the teeth 18 is assured.

The circumferential dimension of the through hole 34 is set so that the teeth 18 which faces the magnetic pole 20B in the radial direction is substantially magnetically saturated at the position having the through hole 34 in the non-energized state of the coil winding 7. In this example, each circumferential width of the through hole 34 at both sides of the body part 18a is set to W1/2, and the circumferential width of the body part 18a in the part with the through hole 34 is set to W1. The width W1 is set to the same value as the one set in the embodiment.

(2-2. Magnetic Flux Distribution at Each Load)

FIG. 14 shows the magnetic flux distribution in the no-load state having no AC current applied to the stator 2, FIG. 15 shows the state resulting from application of 50% of rated load AC current (corresponding to load current) of the q-axis component (torque component), FIG. 16 shows the state resulting from application of 100% of rated load AC current, FIG. 17 shows the state resulting from application of 150% of load AC current, and FIG. 18 shows the state resulting from application of 200% of load AC current, respectively. Note that the positional relationship between the teeth 18 and the d-axis, q-axis is similar to the one as shown in FIG. 5.

In the present embodiment, the circumferential width dimension W1 is set to the small value, and the cross-section area of the teeth body part 18a is set to the small value, by forming the through holes 34 in the respective teeth main body parts 18a. Accordingly, on the d-axis coincided with the U-phase where the instantaneous current value is 0, the teeth body part 18a which faces the magnetic poles 20BN, 20BS has been substantially magnetically saturated only by the constant magnetic flux from the permanent magnet 21. In other words, in spite of increase in the load AC current, the total amount Ld of the d-axis inductance in the entire rotor 3 expressed in the formula (1) is kept small.

Moreover, in the present embodiment, as the load AC current is sequentially increased from 0% to 200%, the q-axis inductance across the V-phase and W-phase to which the instantaneous current value is applied, is increased. This is resulting from magnifying effect for weakening the magnetic saturation at the tip end of the teeth widened part 18b as indicated by the sections P1, P2, P3 in the drawing as the increase in the load AC current. In this way, the increase in the load AC current proceeds the magnetic saturation over the area of the V-phase and W-phase. On the contrary, the magnetic saturation is significantly weakened in the sections P1, P2, P3. As a result, the q-axis inductance is increased comprehensively in the end (see FIGS. 14-18). This may increase the total amount Lq of the q-axis inductance in the entire rotor 3 expressed in the formula (1) in accordance with increase in the load AC current.

As described above, the present embodiment may ensure to prevent lowering of the magnetic pole saliency ratio ρ while being kept large in spite of increase in the load AC current (motor load).

Note that the through hole 34 according to the present embodiment corresponds to the example of means for saturating magnetically the tooth which radially faces the magnetic pole in the non-energized state of the stator winding.

(2-3. Effect of the Second Embodiment)

As described above, in the second embodiment, the axially piercing through hole 34 is formed in each of the plurality of teeth 18 of the stator core 5, which provides similar effects to those derived from the first embodiment.

FIG. 19 corresponding to aforementioned FIG. 12, in the present embodiment illustrates simulation results of the high frequency inductance upon superposed input of the exploration signal in the state that the load current is applied to the q-axis (current application from V-phase to W-phase). As FIG. 19 shows, the results represent each of the d-axis high frequency inductance changes with substantially sinusoidal wave-like curve at the respective load values (magnitude of AC load current), and with relatively less phase shift resulting in phase consistency. Furthermore, as the drawing shows, it is found that sufficient magnetic pole saliency ratio ρ may be assured even in the no-load state, which further becomes high as the load is increased.

Furthermore, especially in the present embodiment, the through hole 34 is formed in the center position of the teeth 18 in the circumferential direction. This makes it possible to form the teeth 18 symmetrically shaped in the circumferential direction, resulting in reduced cogging.

3. Modified Example

Note that the first and the second embodiments described above may be modified into various forms so long as they do not deviate from the scope and technical concept.

For example, circumferential interconnection of the widened parts 18b of the adjacent teeth 18 of the stator core 5 has been described as an example, but this is not limiting. It is also possible, for example, to allow widened parts 118b of adjacent teeth 118 of a stator core 105 to include the respective tip ends apart from each other as indicated by FIG. 20 corresponding to FIG. 2, in this case, the effect for reducing the leakage magnetic flux between the adjacent teeth 118 may be further improved. This makes it possible to prevent increase in the leakage inductance on the d-axis, assuring the magnetic pole saliency ratio ρ.

Moreover, formation of either the recess 32 or the through hole 34 in the teeth 18 has been described above as the example. However, it is possible to form both the recess and the through hole in the teeth 18. In addition, it is also possible to increase the number of the recesses 32 and the through holes 34.

Moreover, for example, in the embodiment, the slot combination configuration of 10P12S was explained as an example, but even in the other slot combination configurations, only an arrangement interval angle among each of the U-phase, the V-phase, and the W-phase or the arrangement interval angle of each of the dq-axis coordinates is changed and arrangement relationships between each of the U-phase, the V-phase, and the W-phase and each of the dq-axis coordinates are not changed, and thus, the similar effect can be obtained.

Moreover, for example, in the embodiment, it is configured such that the tooth 18 facing the magnetic pole 20B in a no-load state is substantially magnetically saturated only by the magnetic flux from the permanent magnet 21 by appropriately setting the dimension in the circumferential direction of the recess 32 or the through hole 34 of each of the teeth 18, but this is not limiting. For example, a method of improving a magnetic force of the permanent magnet 21 provided in the rotor 3 or of appropriately setting both the width dimension of the tooth 18 (at position of the recess 32 or the through hole 34) and the magnetic force of the permanent magnet 21 may be employed.

Furthermore, in the embodiments, for example, integral formation of the cylindrical yoke 15 of the rotor core 5 and the plurality of teeth 18, respectively, has been described as the example. However, it is also possible to include the yoke 15 and the plurality of teeth 18 separable for the single teeth 18.

Moreover, for example, in the embodiment, the example in which the rotating electric machine 1 is a rotary motor was explained, but this is not limiting. For example, though not particularly shown, the method of the present embodiment may be applied to a linear motor in which a mover linearly moves with respect to a stator. In this case, either one of the stator and the mover is provided with the magnetic pole by the permanent magnet, while the other is provided with the coil winding generating a magnetic field and the tooth. But in any case, it is only necessary to determine the dimension of the teeth in a movement direction of the mover such that the tooth facing the magnetic pole in a no-load state is substantially magnetically saturated only by the magnetic flux from the permanent magnet.

In the above, the example in which the rotating electric machine 1 is a motor was explained, but the present embodiment can be also applied to the case in which the rotating electric machine is a generator.

Moreover, other than those described above, methods of the aforementioned embodiment and each of the variations may be used in combination as appropriate. Though not particularly exemplified, the embodiment and each of the variations are put into practice with various changes within a range not departing from the gist thereof.

4. Hardware Configuration Embodiment of Controller

A hardware configuration embodiment will be described for the controller 300 achieving the processes of the voltage control unit 323, the rectangular-wave voltage generator 325, etc. implemented by a program executed by the CPU 901 described above, with reference to FIG. 21. In FIG. 21, a configuration related to a function of supplying a drive electric power to the rotating electric machine 1 of the controller 300 is not shown.

As shown in FIG. 21, the controller 300 has, for example, a CPU 901, a ROM 903, a RAM 905, a dedicated integrated circuit 907 constructed for specific use such as an ASIC or an FPGA, an input device 913, an output device 915, a storage device 917, a drive 919, a connection port 921, and a communication device 923. These constituent elements are mutually connected via a bus 909 and an I/O interface 911 such that signals can be transferred.

The program can be recorded in a recording device such as the ROM 903, the RAM 905, and the storage device 917, for example.

The program can also temporarily or permanently be recorded in a removable recording medium 925 such as magnetic disks including flexible disks, various optical disks including CDs, MO disks, and DVDs, and semiconductor memories. The removable recording medium 925 as described above can be provided as so-called packaged software. In this case, the program recorded in the removable recording medium 925 may be read by the drive 919 and recorded in the recording device through the I/O interface 911, the bus 909, etc.

The program may be recorded in, for example, a download site, another computer, or another recording device (not shown). In this case, the program is transferred through a network NW such as a LAN and the Internet and the communication device 923 receives this program. The program received by the communication device 923 may be recorded in the recording device through the I/O interface 911, the bus 909, etc.

The program may be recorded in appropriate externally-connected equipment 927, for example. In this case, the program may be transferred through the appropriate connection port 921 and recorded in the recording device through the I/O interface 911, the bus 909, etc.

The CPU 901 executes various process in accordance with the program recorded in the recording device to implement the processes of the voltage control unit 323, the rectangular-wave voltage generator 325, etc (applying the high frequency voltage to at least one of the d-axis and the q-axis, and applying the load current to the q-axis). In this case, the CPU 901 may directly read and execute the program from the recording device or may be execute the program once loaded in the RAM 905. In the case that the CPU 901 receives the program through, for example, the communication device 923, the drive 919, or the connection port 921, the CPU 901 may directly execute the received program without recording in the recording device.

The CPU 901 may execute various processes based on a signal or information input from the input device 913 such as a mouse, a keyboard, and a microphone (not shown) as needed.

The CPU 901 may output a result of execution of the process from the output device 915 such as a display device and a sound output device, for example, and the CPU 901 may transmit this process result through the communication device 923 or the connection port 921 as needed or may record the process result into the recording device or the removable recording medium 925.

What is claimed is:

1. A rotating electric machine, comprising:
   a stator;
   a rotor; and
   a stator core comprising a plurality of teeth, each of the teeth comprising at least one of a through hole axially piercing the tooth and a recess extending from one end of the tooth to another end of the tooth in an axial direction, each of the teeth comprising:
      a body part protruding from a cylindrical yoke toward an inner circumferential side, a circumferential width dimension of the body part being fixed; and
      a widened part positioned at a tip end of the body part at the inner circumferential side, the circumferential width dimension of the widened part being extended to be larger than the circumferential dimension of the body part,
   wherein the through hole is formed at a center position of the body part in a circumferential direction, and
   wherein two of the recesses are formed at same radial positions at both sides of the body part in the circumferential direction, the two of the recesses reducing a cross-section area of the body part in the circumferential direction.

2. The rotating electric machine according to claim 1, wherein the widened parts are interconnected through the teeth adjacent to each other, and
wherein the stator core comprises the teeth connected into a cylindrical formation that is separable from the cylindrical yoke, the teeth being fixed to an inner circumferential side of the yoke.

3. The rotating electric machine according to claim 2, further comprising:
a rotor core comprising a plurality of magnetic poles arranged in the circumferential direction;
a plurality of permanent magnets in the rotor core; and
a stator winding wound around the teeth,
wherein a dimension of the through hole in the circumferential direction is set such that the tooth that faces the magnetic pole in a radial direction in a non-energized state of the stator winding is magnetically saturated by the permanent magnet at a position where the through hole is formed.

4. The rotating electric machine according to claim 1, further comprising:
a rotor core comprising a plurality of magnetic poles arranged in the circumferential direction;
a plurality of permanent magnets in the rotor core; and
a stator winding wound around the teeth,
wherein a dimension of the through hole or the recess in the circumferential direction is set such that the tooth that faces the magnetic pole in a radial direction in a non-energized state of the stator winding is magnetically saturated by the permanent magnet at a position where the through hole or the recess is formed.

5. The rotating electric machine according to claim 4, wherein the plurality of permanent magnets are disposed inside the rotor core.

6. The rotating electric machine according to claim 5, wherein the rotor core comprises a cylindrical part, the cylindrical part being fixed to a shaft and disposed inner circumferential side of the plurality of magnetic poles, and
wherein the permanent magnets are arranged along a radial direction from a portion close to an outer circumference of the cylindrical part to a portion close to the outer circumference of the rotor core between the magnetic poles of the rotor core.

7. The rotating electric machine according to claim 6, wherein the stator winding is wound around the teeth through concentrated winding.

8. A rotating electric machine, comprising:
a stator;
a rotor;
a rotor core comprising a plurality of magnetic poles arranged in a circumferential direction;
a stator core comprising a plurality of teeth around each of which a stator winding is wound; and
means for saturating magnetically the tooth which radially faces the magnetic pole in the non-energized state of the stator winding,
wherein each of the teeth comprises:
a body part protruding from a cylindrical yoke toward an inner circumferential side, a circumferential width dimension of the body part being fixed; and
a widened part positioned at a tip end of the body part at the inner circumferential side, the circumferential width dimension of the widened part being extended to be larger than the circumferential dimension of the body part,
wherein the means for saturating magnetically the tooth is disposed in the body part.

* * * * *